US010047001B2

(12) United States Patent
West

(10) Patent No.: US 10,047,001 B2
(45) Date of Patent: Aug. 14, 2018

(54) GLASS CUTTING SYSTEMS AND METHODS USING NON-DIFFRACTING LASER BEAMS

(71) Applicant: Corning Incorporated, Corning, NY (US)

(72) Inventor: James Andrew West, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 52 days.

(21) Appl. No.: 14/943,765

(22) Filed: Nov. 17, 2015

(65) Prior Publication Data

US 2016/0159679 A1 Jun. 9, 2016

Related U.S. Application Data

(60) Provisional application No. 62/087,406, filed on Dec. 4, 2014.

(51) Int. Cl.
*C03B 33/10* (2006.01)
*B23K 26/382* (2014.01)
(Continued)

(52) U.S. Cl.
CPC .......... *C03B 33/102* (2013.01); *B23K 26/064* (2015.10); *B23K 26/0622* (2015.10);
(Continued)

(58) Field of Classification Search
CPC .............. C03B 33/0222; C03B 33/102; B23K 26/0622; B23K 26/064; B23K 26/0648;
(Continued)

(56) References Cited

U.S. PATENT DOCUMENTS

| 1,790,397 A | 1/1931 | Woods et al. |
| 2,682,134 A | 6/1954 | Stookey |

(Continued)

FOREIGN PATENT DOCUMENTS

| CN | 2388062 Y | 7/2000 |
| CN | 1283409 C | 11/2006 |

(Continued)

OTHER PUBLICATIONS

International Search Report, issued in connection with corresponding PCT application No. PCT/US2015/063063, dated Feb. 23, 2016.

(Continued)

*Primary Examiner* — Geoffrey S Evans
(74) *Attorney, Agent, or Firm* — Kevin L. Bray

(57) ABSTRACT

Embodiments are directed to systems for laser cutting at least one glass article comprising a pulsed laser assembly and a glass support assembly configured to support the glass article during laser cutting within the pulsed laser assembly, wherein the pulsed laser assembly comprises at least one non-diffracting beam (NDB) forming optical element configured to convert an input beam into a quasi-NDB beam; and at least one beam transforming element configured to convert the quasi-NDB beam into multiple quasi-NDB sub-beams spaced apart a distance of about 1 μm to about 500 μm; wherein the pulsed laser assembly is oriented to deliver one or more pulses of multiple quasi-NDB sub-beams onto a surface of the glass article, wherein each pulse of multiple quasi-NDB sub-beams is operable to cut a plurality of perforations in the glass article.

16 Claims, 16 Drawing Sheets

(51) Int. Cl.
*B23K 26/067* (2006.01)
*B23K 26/40* (2014.01)
*B23K 26/06* (2014.01)
*B23K 26/402* (2014.01)
*C03B 33/02* (2006.01)
*B23K 26/064* (2014.01)
*B23K 26/0622* (2014.01)
*B23K 103/00* (2006.01)

(52) U.S. Cl.
CPC ...... *B23K 26/0648* (2013.01); *B23K 26/0676* (2013.01); *B23K 26/382* (2015.10); *B23K 26/402* (2013.01); *C03B 33/0222* (2013.01); *B23K 2203/50* (2015.10); *B23K 2203/54* (2015.10); *Y02P 40/57* (2015.11)

(58) Field of Classification Search
CPC .............. B23K 26/0676; B23K 26/382; B23K 26/402; B23K 2203/54
See application file for complete search history.

(56) References Cited

U.S. PATENT DOCUMENTS

| | | |
|---|---|---|
| 2,749,794 A | 6/1956 | O'Leary |
| 3,647,410 A | 3/1972 | Heaton et al. |
| 3,695,497 A | 10/1972 | Dear |
| 3,695,498 A | 10/1972 | Dear |
| 3,729,302 A | 4/1973 | Heaton |
| 3,775,084 A | 11/1973 | Heaton |
| 4,226,607 A | 10/1980 | Domken |
| 4,441,008 A | 4/1984 | Chan |
| 4,546,231 A | 10/1985 | Gresser et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 5,035,918 A | 7/1991 | Vyas |
| 5,040,182 A | 8/1991 | Spinelli et al. |
| 5,104,210 A | 4/1992 | Tokas |
| 5,108,857 A | 4/1992 | Kitayama et al. |
| 5,112,722 A | 5/1992 | Tsujino et al. |
| 5,114,834 A | 5/1992 | Nachshon |
| 5,265,107 A | 11/1993 | Delfyett, Jr. |
| 5,400,350 A | 3/1995 | Galvanauskas |
| 5,434,875 A | 7/1995 | Rieger et al. |
| 5,436,925 A | 7/1995 | Lin et al. |
| 5,553,093 A | 9/1996 | Ramaswamy et al. |
| 5,574,597 A | 11/1996 | Kataoka |
| 5,586,138 A | 12/1996 | Yokoyama |
| 5,676,866 A * | 10/1997 | in den Baumen ..... B23K 26/04 219/121.74 |
| 5,696,782 A | 12/1997 | Harter et al. |
| 5,736,709 A | 4/1998 | Neiheisel |
| 5,776,220 A | 7/1998 | Allaire et al. |
| 6,016,223 A | 1/2000 | Canon |
| 6,016,324 A | 1/2000 | Rieger et al. |
| 6,038,055 A | 3/2000 | Hänsch et al. |
| 6,055,829 A | 5/2000 | Witzmann et al. |
| 6,078,599 A | 6/2000 | Everage et al. |
| 6,156,030 A | 12/2000 | Neev |
| 6,160,835 A | 12/2000 | Kwon |
| 6,186,384 B1 | 2/2001 | Sawada |
| 6,210,401 B1 | 4/2001 | Lai |
| 6,256,328 B1 | 7/2001 | Delfyett et al. |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,322,958 B1 | 11/2001 | Hayashi |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,484,052 B1 | 11/2002 | Visuri et al. |
| 6,489,589 B1 | 12/2002 | Alexander |
| 6,501,578 B1 | 12/2002 | Bernstein et al. |
| 6,552,301 B2 | 4/2003 | Herman et al. |
| 6,573,026 B1 | 6/2003 | Aitken et al. |
| 6,592,703 B1 | 7/2003 | Habeck et al. |
| 6,635,849 B1 | 10/2003 | Okawa |
| 6,635,850 B2 | 10/2003 | Amako et al. |
| 6,720,519 B2 | 4/2004 | Liu et al. |
| 6,729,161 B1 | 5/2004 | Miura et al. |
| 6,800,237 B1 | 10/2004 | Yamamoto et al. |
| 6,800,831 B1 | 10/2004 | Hoetzel |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,353,829 B1 | 4/2008 | Wachter et al. |
| 7,511,886 B2 | 3/2009 | Schultz et al. |
| 7,535,634 B1 | 5/2009 | Savchenkov et al. |
| 7,633,033 B2 | 12/2009 | Thomas et al. |
| 7,642,483 B2 | 1/2010 | You et al. |
| 7,726,532 B2 | 6/2010 | Gonoe |
| 8,104,385 B2 | 1/2012 | Hayashi et al. |
| 8,118,971 B2 | 2/2012 | Hori et al. |
| 8,132,427 B2 | 3/2012 | Brown et al. |
| 8,168,514 B2 | 5/2012 | Garner et al. |
| 8,245,539 B2 | 8/2012 | Lu et al. |
| 8,245,540 B2 | 8/2012 | Abramov et al. |
| 8,269,138 B2 | 9/2012 | Garner et al. |
| 8,283,595 B2 | 10/2012 | Fukuyo et al. |
| 8,292,141 B2 | 10/2012 | Cox et al. |
| 8,296,066 B2 | 10/2012 | Zhao et al. |
| 8,327,666 B2 | 12/2012 | Harvey et al. |
| 8,341,976 B2 | 1/2013 | Dejneka et al. |
| 8,347,651 B2 | 1/2013 | Abramov et al. |
| 8,358,888 B2 | 1/2013 | Ramachandran |
| 8,444,906 B2 | 5/2013 | Lee et al. |
| 8,448,471 B2 | 5/2013 | Kumatani et al. |
| 8,518,280 B2 | 8/2013 | Hsu et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,697,228 B2 | 4/2014 | Carre et al. |
| 8,720,228 B2 | 5/2014 | Li |
| 8,826,696 B2 | 9/2014 | Brown et al. |
| 8,852,698 B2 | 10/2014 | Fukumitsu |
| 8,887,529 B2 | 11/2014 | Lu et al. |
| 8,916,798 B2 | 12/2014 | Plüss |
| 8,943,855 B2 | 2/2015 | Gomez et al. |
| 8,971,053 B2 | 3/2015 | Kariya et al. |
| 9,138,913 B2 | 9/2015 | Arai et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,446,590 B2 | 9/2016 | Chen et al. |
| 9,481,598 B2 | 11/2016 | Bergh et al. |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2002/0139786 A1 * | 10/2002 | Amako ................ B23K 26/067 219/121.76 |
| 2003/0006221 A1 | 1/2003 | Hong et al. |
| 2005/0024743 A1 | 2/2005 | Camy-Peyret |
| 2005/0098548 A1 | 5/2005 | Kobayashi et al. |

(56) References Cited

U.S. PATENT DOCUMENTS

| | | |
|---|---|---|
| 2005/0115938 A1 | 6/2005 | Sawaki et al. |
| 2005/0274702 A1 | 12/2005 | Deshi |
| 2006/0011593 A1 | 1/2006 | Fukuyo |
| 2006/0028728 A1* | 2/2006 | Li .................. G02B 26/0808 359/573 |
| 2006/0109874 A1* | 5/2006 | Shiozaki ............ B23K 26/38 219/121.6 |
| 2006/0127679 A1 | 6/2006 | Gulati et al. |
| 2006/0227440 A1 | 10/2006 | Gluckstad |
| 2006/0289410 A1 | 12/2006 | Morita |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0099444 A1 | 5/2008 | Misawa et al. |
| 2009/0013724 A1 | 1/2009 | Koyo et al. |
| 2009/0176034 A1 | 7/2009 | Ruuttu et al. |
| 2009/0183764 A1 | 7/2009 | Meyer |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0025387 A1 | 2/2010 | Arai et al. |
| 2010/0029460 A1 | 2/2010 | Shojiya et al. |
| 2010/0032087 A1 | 2/2010 | Takahashi et al. |
| 2010/0086741 A1 | 4/2010 | Bovatsek et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0326138 A1 | 12/2010 | Kumatani et al. |
| 2011/0049765 A1 | 3/2011 | Li et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0183116 A1 | 7/2011 | Hung et al. |
| 2011/0240611 A1 | 10/2011 | Sandstrom |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0103018 A1 | 5/2012 | Lu et al. |
| 2012/0131962 A1 | 5/2012 | Mitsugi et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0056450 A1* | 3/2013 | Lissotschenko ... B23K 26/0604 219/121.74 |
| 2013/0068736 A1 | 3/2013 | Mielke et al. |
| 2013/0075480 A1 | 3/2013 | Yokogi et al. |
| 2013/0091897 A1 | 4/2013 | Fugii et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0192305 A1 | 8/2013 | Black et al. |
| 2013/0209731 A1 | 8/2013 | Nattermann et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0199519 A1 | 7/2014 | Schillinger et al. |
| 2014/0216108 A1 | 8/2014 | Weigel et al. |
| 2014/0290310 A1 | 10/2014 | Green |
| 2014/0320947 A1 | 10/2014 | Egerton et al. |
| 2014/0333929 A1 | 11/2014 | Sung et al. |
| 2014/0361463 A1 | 12/2014 | DeSimone et al. |
| 2015/0034612 A1 | 2/2015 | Hosseini et al. |
| 2015/0038313 A1 | 2/2015 | Hosseini |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0136743 A1 | 5/2015 | Hosseini |
| 2015/0140241 A1 | 5/2015 | Hosseini |
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165548 A1 | 6/2015 | Marjanovic et al. |
| 2015/0165560 A1 | 6/2015 | Hackert et al. |
| 2015/0165562 A1 | 6/2015 | Marjanovic et al. |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166394 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0183679 A1 | 7/2015 | Saito |
| 2015/0232369 A1 | 8/2015 | Marjanovic et al. |
| 2015/0299018 A1 | 10/2015 | Bhuyan et al. |
| 2015/0360991 A1 | 12/2015 | Grundmueller et al. |
| 2015/0367442 A1 | 12/2015 | Bovatsek et al. |
| 2016/0008927 A1 | 1/2016 | Grundmueller et al. |
| 2016/0009066 A1 | 1/2016 | Nieber et al. |
| 2016/0023922 A1 | 1/2016 | Addiego et al. |
| 2016/0031745 A1 | 2/2016 | Ortner et al. |
| 2016/0060156 A1 | 3/2016 | Krueger et al. |

(56) References Cited

U.S. PATENT DOCUMENTS

2016/0280580 A1 9/2016 Bohme
2016/0290791 A1 10/2016 Buono et al.

FOREIGN PATENT DOCUMENTS

| | | |
|---|---|---|
| CN | 101502914 A | 8/2009 |
| CN | 201357287 Y | 12/2009 |
| CN | 101637849 A | 2/2010 |
| CN | 201471092 U | 5/2010 |
| CN | 102672355 A | 9/2012 |
| CN | 102898014 A | 1/2013 |
| CN | 102923939 A | 2/2013 |
| CN | 103013374 A | 4/2013 |
| CN | 103143841 A | 6/2013 |
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 103746027 A | 4/2014 |
| CN | 203509350 U | 4/2014 |
| CN | 104344202 A | 2/2015 |
| CN | 102672355 B | 5/2015 |
| DE | 2231330 A1 | 1/1974 |
| DE | 102006035555 A1 | 1/2008 |
| DE | 102012010635 A1 | 11/2013 |
| DE | 102012110971 A1 | 5/2014 |
| DE | 102013223637 A1 | 5/2015 |
| EP | 270897 A1 | 2/1992 |
| EP | 0609978 A1 | 8/1994 |
| EP | 656241 | 12/1998 |
| EP | 656241 B1 | 12/1998 |
| EP | 938946 A1 | 9/1999 |
| EP | 949541 A2 | 10/1999 |
| EP | 1159104 B1 | 8/2004 |
| EP | 1609559 A1 | 12/2005 |
| EP | 1043110 | 8/2006 |
| EP | 1043110 B1 | 8/2006 |
| EP | 2133170 A1 | 12/2009 |
| EP | 2202545 | 6/2010 |
| EP | 2202545 A1 | 6/2010 |
| EP | 2574983 A1 | 4/2013 |
| EP | 2754524 B1 | 7/2014 |
| EP | 2781296 A1 | 9/2014 |
| EP | 2783784 A2 | 10/2014 |
| EP | 2859984 A2 | 4/2015 |
| FR | 2989294 A1 | 10/2013 |
| GB | 1242172 A | 8/1971 |
| GB | 2481190 B | 1/2015 |
| JP | 1179770 A | 7/1989 |
| JP | 6318756 A | 11/1994 |
| JP | 9106243 A | 4/1997 |
| JP | 11197498 A | 7/1999 |
| JP | 11269683 A | 10/1999 |
| JP | 11330597 A | 11/1999 |
| JP | 11347758 A | 12/1999 |
| JP | 2001138083 | 5/2001 |
| JP | 2001138083 A | 5/2001 |
| JP | 2002210730 A | 7/2002 |
| JP | 2002228818 | 8/2002 |
| JP | 2002228818 A | 8/2002 |
| JP | 2003025085 | 1/2003 |
| JP | 2003025085 A | 1/2003 |
| JP | 2003114400 | 4/2003 |
| JP | 2003114400 A | 4/2003 |
| JP | 2003154517 A | 5/2003 |
| JP | 2003181668 | 7/2003 |
| JP | 2003181668 A | 7/2003 |
| JP | 2003238178 A | 8/2003 |
| JP | 2004209675 A | 7/2004 |
| JP | 2005104819 A | 4/2005 |
| JP | 2005205440 | 8/2005 |
| JP | 2005205440 A | 8/2005 |
| JP | 2005288503 A | 10/2005 |
| JP | 03775250 | 5/2006 |
| JP | 3775250 B2 | 5/2006 |
| JP | 03775410 | 5/2006 |
| JP | 3775410 B2 | 5/2006 |
| JP | 2006130691 A | 5/2006 |
| JP | 2006248885 A | 9/2006 |
| JP | 2007021548 A | 2/2007 |
| JP | 2007196277 | 8/2007 |
| JP | 2007196277 A | 8/2007 |
| JP | 2007253203 | 10/2007 |
| JP | 2007253203 A | 10/2007 |
| JP | 4592855 B2 | 12/2010 |
| JP | 2011049398 A | 3/2011 |
| JP | 4672689 B2 | 4/2011 |
| JP | 2011517299 A | 6/2011 |
| JP | 4880820 B2 | 2/2012 |
| JP | 2012024782 A | 2/2012 |
| JP | 2012031018 A | 2/2012 |
| JP | 2012159749 A | 8/2012 |
| JP | 2013007842 | 1/2013 |
| JP | 2013007842 A | 1/2013 |
| JP | 2013043808 A | 3/2013 |
| JP | 2013075802 A | 4/2013 |
| JP | 2013091578 A | 5/2013 |
| JP | 05274085 | 8/2013 |
| JP | 5274085 B2 | 8/2013 |
| JP | 05300544 | 9/2013 |
| JP | 5300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| KR | 2012015366 | 2/2002 |
| KR | 2009057161 | 6/2009 |
| KR | 1020621 | 3/2011 |
| KR | 1120471 B1 | 3/2012 |
| KR | 2012074508 | 7/2012 |
| KR | 2012074508 A | 7/2012 |
| KR | 2013031380 | 3/2013 |
| KR | 1269474 | 5/2013 |
| KR | 2013124646 | 11/2013 |
| KR | 1344368 | 12/2013 |
| KR | 2014022980 | 2/2014 |
| KR | 2014022981 | 2/2014 |
| KR | 2014064220 | 5/2014 |
| TW | 201226345 | 7/2012 |
| WO | 1999029243 A1 | 7/1999 |
| WO | 1999063900 A1 | 12/1999 |
| WO | 2004110693 A1 | 12/2004 |
| WO | 2006073098 A1 | 7/2006 |
| WO | 2007094160 A1 | 8/2007 |
| WO | 2008080182 A1 | 7/2008 |
| WO | 2008128612 A1 | 10/2008 |
| WO | 2009114375 A2 | 9/2009 |
| WO | 2010035736 | 4/2010 |
| WO | 2010035736 A1 | 4/2010 |
| WO | 2010111609 A2 | 9/2010 |
| WO | 2010129459 A2 | 11/2010 |
| WO | 2011025908 A1 | 3/2011 |
| WO | 2011056781 A1 | 5/2011 |
| WO | 2012006736 A2 | 1/2012 |
| WO | 2012075072 A2 | 6/2012 |
| WO | 2012108052 A1 | 8/2012 |
| WO | 2012166753 A1 | 12/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | 2014028022 A1 | 2/2014 |
| WO | 2014064492 A1 | 5/2014 |
| WO | 2014079478 A1 | 5/2014 |
| WO | 2014079570 A1 | 5/2014 |
| WO | 2014085663 A1 | 6/2014 |
| WO | 2014111385 A1 | 7/2014 |
| WO | 2014111794 A1 | 7/2014 |
| WO | 2014161534 A2 | 10/2014 |
| WO | 2014161535 A2 | 10/2014 |
| WO | 2015077113 A1 | 5/2015 |

(56) References Cited

FOREIGN PATENT DOCUMENTS

| WO | 2015095088 A1 | 6/2015 |
|----|---------------|--------|
| WO | 2015095090 A1 | 6/2015 |
| WO | 2015095146 A1 | 6/2015 |
| WO | 2015127583 A1 | 9/2015 |
| WO | 2016010954 A2 | 1/2016 |

OTHER PUBLICATIONS

A. Couairon et al., "Femtosecond filamentation in transparent media", Physics Reports, 441, 41-189, (2007).
Abakians, H. et al.; Evaporative Cutting of a Semitransparent Body With a Moving CW Laser; Journal of Heat Transfer; Nov. 1988; pp. 924-930; vol. 110; ASME.
Ahmed, F. et al.; Display glass cutting by femtosecond laser induced single shot periodic void array; Applied Physics A Material Science & Processing; Jun. 3, 2008; pp. 189-192; vol. 93; Springer-Verlag.
Bagchi, S. et al.; Fast ion beams from intense, femtosecond laser irradiated nanostructured surfaces; Applied Physics B Lasers and Optics; Jun. 27, 2007; pp. 167-173; vol. 88; Springer-Verlag.
Bhuyan, M.K. et al.; Femtosecond non-diffracting Bessel beams and controlled nanoscale ablation; ResearchGate Conference Paper; Sep. 2011; pp. 1-4.
Bhuyan, M.K. et al.; Laser micro—and nanostructuring using femtosecond Bessel beams; The European Physical Journal Special Topics; Dec. 7, 2011; pp. 101-110; vol. 1999; EDP Sciences, Springer-Verlag.
Bhuyan, M.K. et al.; Single-shot high aspect ratio bulk nanostructuring of fused silica using chirp-controlled ultrafast laser Bessel beams; Applied Physics Letters; Jan. 14, 2014; pp. 021107-1-021107-4; vol. 104; AIP Publishing LLC.
Case Design Guidelines for Apple Devices; Sep. 13, 2013; pp. 1-58; Apple Inc.
Chiao, R. Y. et al.; Self-Trapping of Optical Beams; Physical Review Letters; Oct. 12, 1964; pp. 479-482; vol. 13, No. 15.
Corning EAGLE AMLCD Glass Substrates Material Information; Apr. 2005; pp. MIE 201-1—MIE 201-3; Corning Incorporated.
Corning 1737 AMLCD Glass Substrates Material Information; Aug. 2002; pp. MIE 101-1—MIE 101-3; Corning Incorporated.
Couairon, A. et al.; Femtosecond filamentation in transparent media; ScienceDirect Physical Reports; Feb. 6, 2007; pp. 47-189; vol. 441; Elsevier B.V.
Courvoisier, F. et al.; Applications of femtosecond Bessel beams to laser ablation; Applied Physics A Materials Science & Processing; Sep. 6, 2012; pp. 29-34; vol. 112; Springer-Verlag.
Courvoisier, F. et al.; Surface nanoprocessing with nondiffracting femtosecond Bessel beams; Optics Letters; Oct. 15, 2009; pp. 3163-3165; vol. 34, No. 20; Optical Society of America.
Dong, M. et al.; On-axis irradiance distribution of axicons illuminated by spherical wave; ScienceDirect Optics & Laser Technology; Sep. 2007; pp. 1258-1261; vol. 39; Elsevier Ltd.
Durnin, J.; Exact solutions for nondiffracting beams. I. The scalar theory; J. Opt. Soc. Am. A; Apr. 1987; pp. 651-654; vol. 4, No. 4; Optical Society of America.
Eaton, S. et al.; Heat accumulation effects in femtosecond laser-written waveguides with variable repetition rate; Optics Express; Jun. 13, 2005; pp. 4708-4716; vol. 13, No. 12; Optical Society of America.
Gattass, R. et al.; Micromachining of bulk glass with bursts of femtosecond laser pulses at variable repetition rates; Optics Express; Jun. 12, 2006; pp. 5279-5284; vol. 14, No. 12; Optical Society of America.
Gori, F. et al.; Analytical derivation of the optimum triplicator; Optics Communications; Dec. 1, 1998; pp. 13-16; vol. 157; Elsevier B.V.
Hu, Z. et al.; 5-Axis Laser Cutting Interference Detection and Correction Based on STL Model; Chinese Journal of Lasers; Dec. 2009; pp. 3313-3317; vol. 36, No. 12.

Huang, Z. et al.; Laser etching of glass substrates by 1064 nm laser irradiation; Applied Physics A Materials Science & Processing; Jun. 6, 2008; pp. 159-163; vol. 93; Springer-Verlag.
Juodkazis, S. et al.; Laser-Induced Microexplosion Confined in the Bulk of a Sapphire Crystal: Evidence of Multimegabar Pressures; Physical Review Letters; Apr. 28, 2006; pp. 166101-1-166101-4; vol. 96; The American Physical Society.
Karlsson, S. et al.; The Technology of Chemical Glass Strengthening—A Review; Glass Technology—European Journal of Glass Science and Technology Part A; Apr. 2010; pp. 41-54; vol. 51, No. 2.
Levy, U. et al.; Design, fabrication, and characterization of circular Dammann gratings based on grayscale lithography; Optics Letters; Mar. 15, 2010; pp. 880-882; vol. 35, No. 6; Optical Society of America.
Liu, X. et al.; Laser Ablation and Micromachining with Ultrashort Laser Pulses; IEEE Journal of Quantum Electronics; Oct. 1997; p. 1706-1716; vol. 33, No. 10; IEEE.
McGloin, D. et al., Bessel beams: diffraction in a new light; Contemporary Physics; Jan.-Feb. 2005; pp. 15-28; vol. 46; Taylor & Francis Ltd.
Merola, F. et al.; Characterization of Bessel beams generated by polymeric microaxicons; Measurement Science and Technology; May 15, 2012; pp. 1-10; vol. 23; IOP Publishing Ltd.
Mirkhalaf, M. et al.; Overcoming the brittleness of glass through bio-inspiration and micro-architecture; Nature Communications; Jan. 28, 2014; pp. 1-9; Macmillan Publishers Limited.
Romero, L. et al.; Theory of optimal beam splitting by phase gratings. II. Square and hexagonal gratings; J. Opt. Soc. Am. A; Aug. 2007; pp. 2296-2312; vol. 24, No. 8; Optical Society of America.
Salleo, A. et al.; Machining of transparent materials using an IR and UV nanosecond pulsed laser; Applied Physics A Materials Science & Processing; Sep. 20, 2000; pp. 601-608; vol. 71; Springer-Verlag.
Shah, L. et al.; Micromachining with a High Repetition Rate Femtosecond Fiber Laser; JLMN-Journal of Laser Micro/Nanoengineering; Nov. 2008; pp. 157-162; vol. 3, No. 3.
Shealy, D. et al.; Geometric optics-based design of laser beam shapers; Opt. Eng.; Nov. 2003; pp. 3123-3138; vol. 42, No. 11; Society of Photo-Optical Instrumentation Engineers.
Stoian, R. et al.; Spatial and temporal laser pulse design for material processing on ultrafast scales; Applied Physics A Materials Science & Processing; Jan. 1, 2014; pp. 119-127; vol. 114; Springer-Verlag Berlin Heidelberg.
Thiele, E.; Relation between Catalytic Activity and Size of Particle; Industrial and Engineering Chemistry; Jul. 1939; pp. 916-920; vol. 31, No. 7.
Toytman, I. et al.; Optical breakdown in transparent media with adjustable axial length and location; Optic Express; Nov. 22, 2010; pp. 24688-24698; vol. 18, No. 24; Optical Society of America.
Wang, Z. et al.; Investigation on CO2 laser irradiation inducing glass strip peeling for microchannel formation; Biomicrofluidics; Mar. 12, 2012; pp. 012820-1-012820-12; vol. 6; American Institute of Physics.
Wu, W. et al.; Optimal Orientation of the Cutting Head for Enhancing Smoothness Movement in Three-Dimensional Laser Cutting; Chinese Journal of Lasers; Jan. 2013; pp. 0103005-1-0103005-7, vol. 10, No. 1.
Xu, H. et al.; Optimization of 3D laser cutting head orientation based on minimum energy consumption; Int J Adv Manuf Technol; Jun. 28 2014; pp. 1283-1291; vol. 74; Springer-Verlag London.
Yan, Y. et al.; Fiber structure to convert a Gaussian beam to higher-order optical orbital angular momentum modes; Optics Letters; Aug. 15, 2012; pp. 3294-3296; vol. 37, No. 16; Optical Society of America.
Arimoto et al., "Imaging properties of axicon in a scanning optical system"; Applied Optics, Nov. 1, 1992, vol. 31, No. 31, pp. 6653-6657.
"TruMicro 5000" Product Manual, Trumpf Laser GmbH + Co. KG, pp. 1-4, Aug. 2011.
Cubeddu et al., "A compact time-resolved reflectance system for dual-wavelength multichannel assessment of tissue absorption and scattering"; Part of the SPIE Conference on Optical Tomography

(56) References Cited

OTHER PUBLICATIONS and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance"; Applied Optics, vol. 38, No. 16, Jun. 1, 1999, pp. 3670-3680.
Ding et al., "High-resolution optical coherence tomography over a large depth range with an axicon lens"; Optic Letters, vol. 27, No. 4, pp-243-245, Feb. 15, 2002, Optical Society of America.
"EagleEtch" Product Brochure, EuropeTec USA Inc., pp. 1-8, Aug. 1, 2014.
Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.
Golub, I., "Fresnel axicon"; Optic Letters, vol. 31, No. 12, Jun. 15, 2006, Optical Society of America, pp. 1890-1892.
Herman et al., "Laser micromachining of 'transparent' fused silica with 1-ps. pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Perry et al., "Ultrashort-pulse laser machining"; UCRL-JC-132159 Rev 1., Jan. 22, 1999, pp. 1-24.
Perry et al., "Ultrashort-pulse laser machining"; UCRL-ID-132159, Sep. 1998, pp. 1-38.
Perry et al., "Ultrashort-pulse laser machining of dielectric materials"; Journal of Applied Physics, vol. 85, No. 9, May 1, 1999, American Institute of Physics, pp. 6803-6810.
"PHAROS High-power femtosecond laser system" product brochure; Light Conversion, Vilnius, LT; Apr. 18, 2011, pp. 1-2.
Polynkin et al., "Extended filamentation with temporally chirped femtosecond Bessel-Gauss beams in air"; Optics Express, vol. 17, No. 2, Jan. 19, 2009, OSA, pp. 575-584.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.

\* cited by examiner

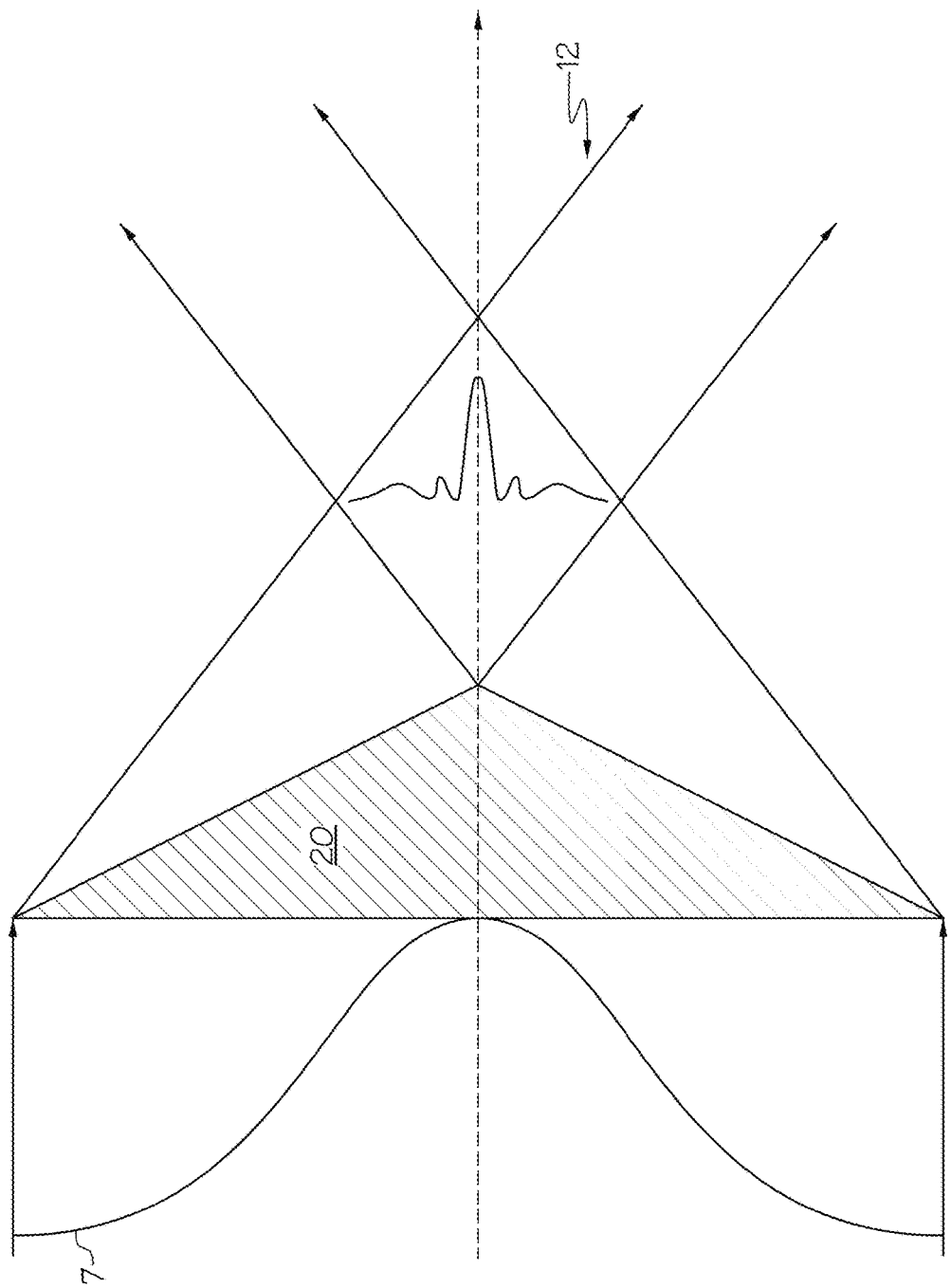

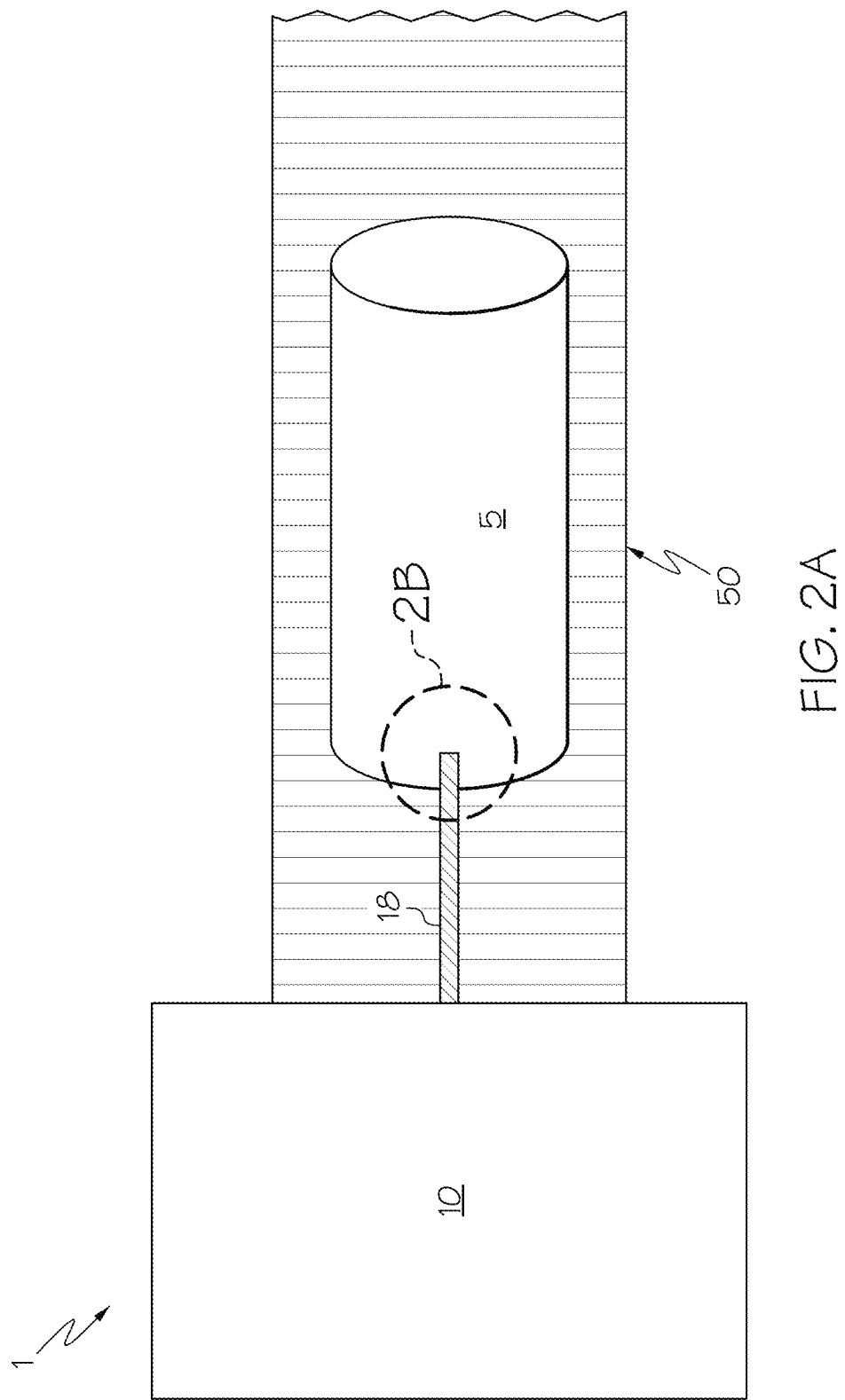

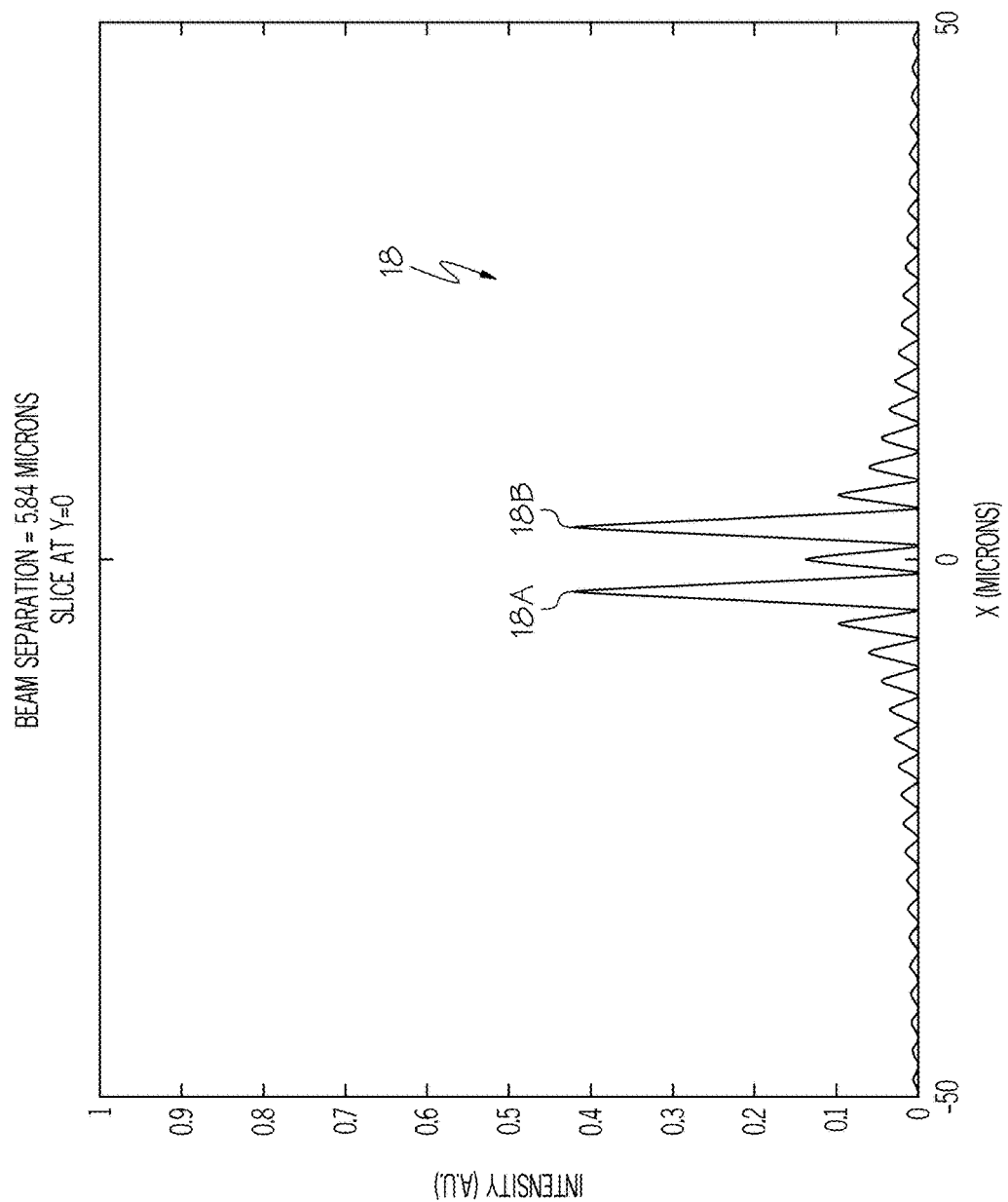

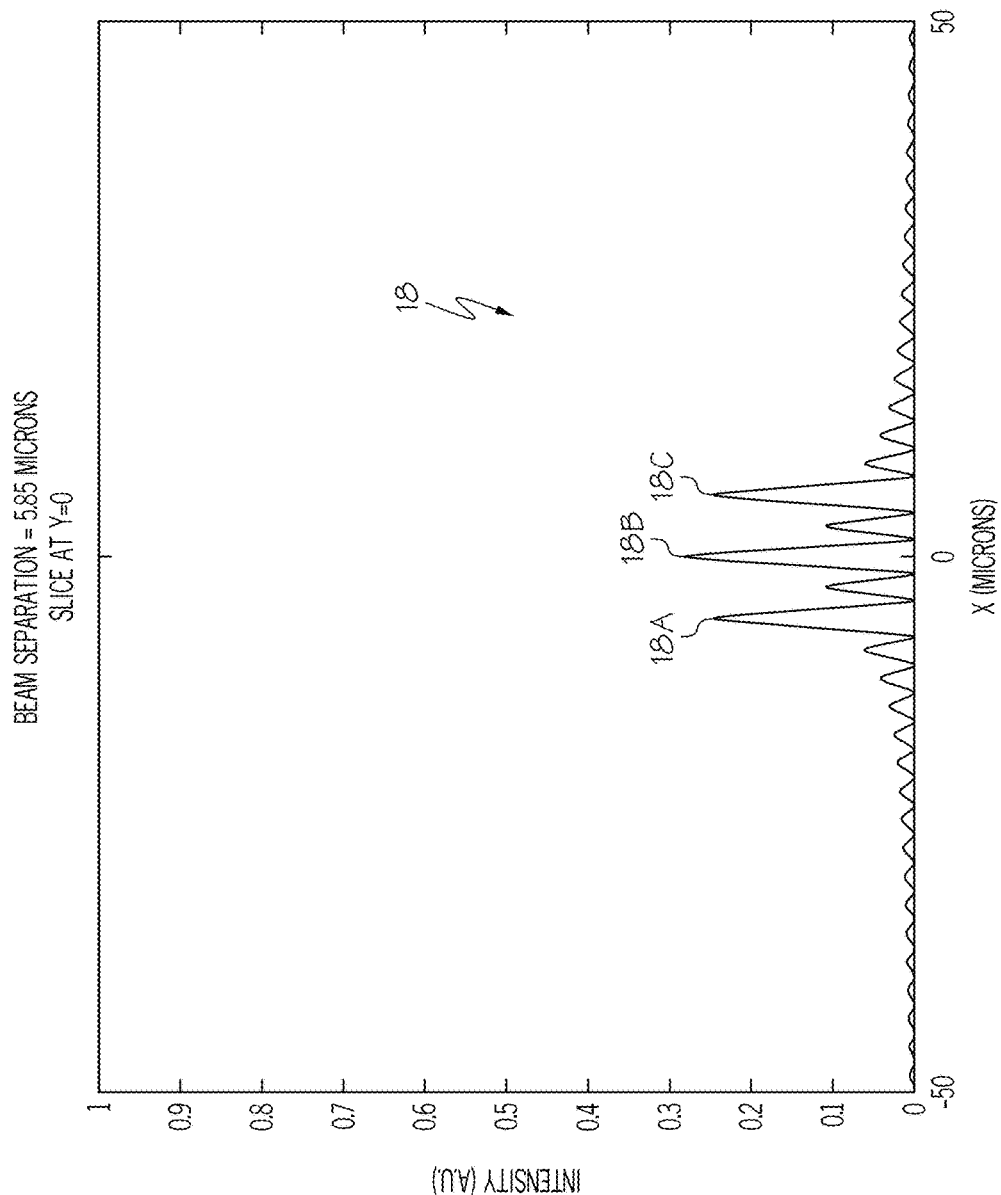

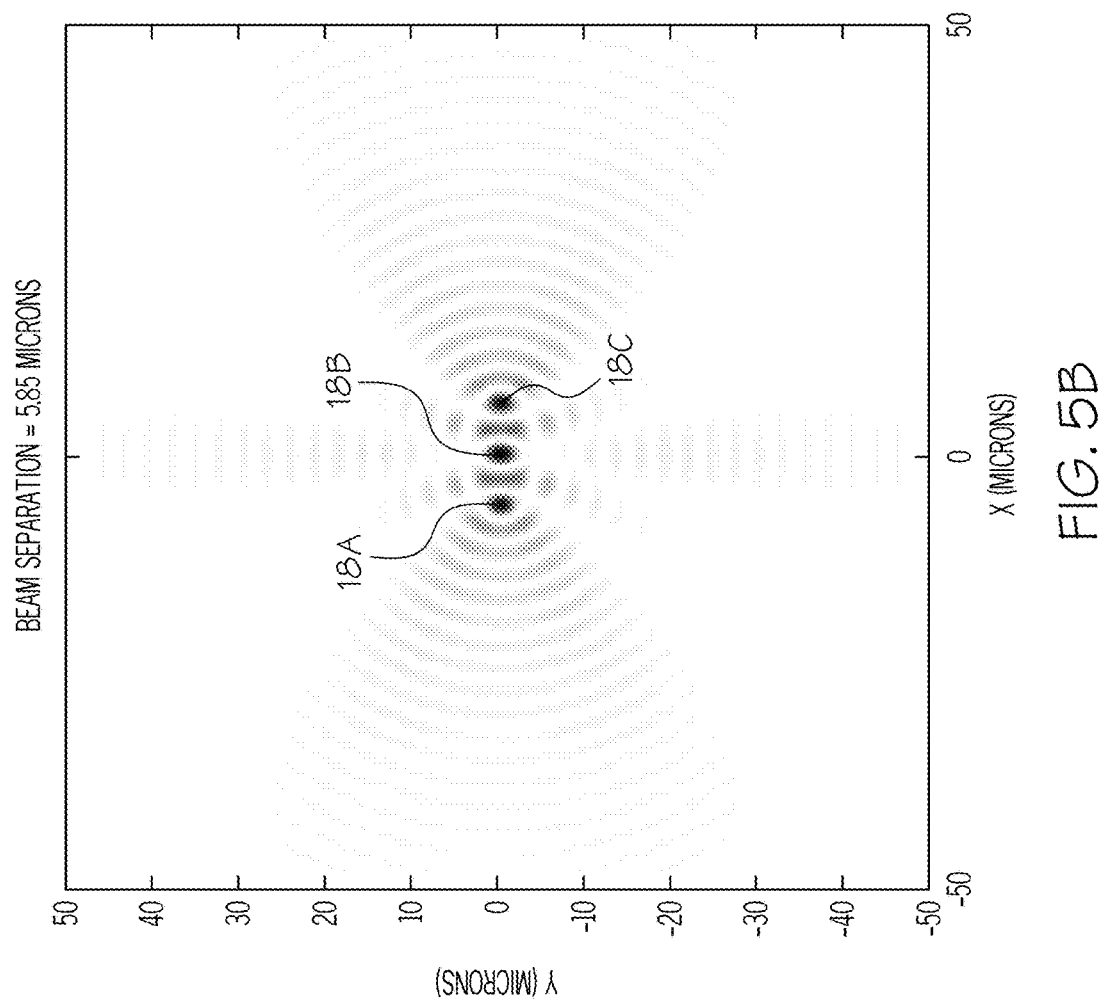

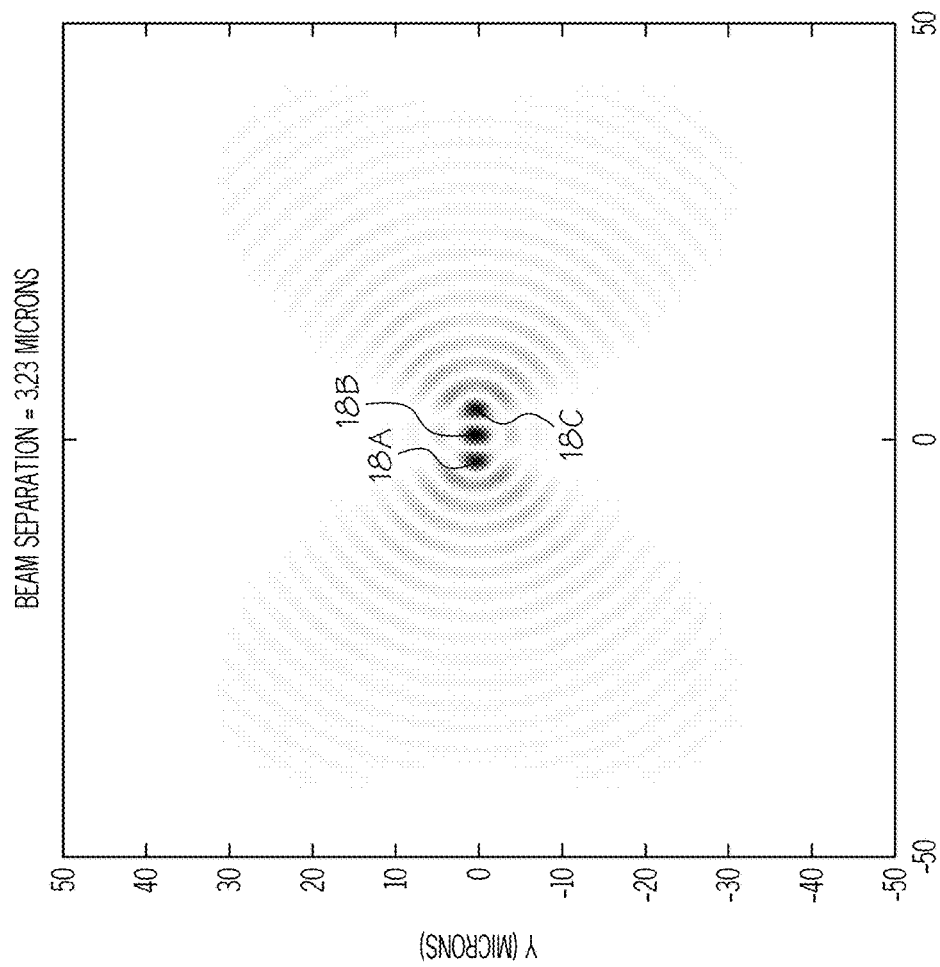

GLASS CUTTING SYSTEMS AND METHODS USING NON-DIFFRACTING LASER BEAMS

This application claims the benefit of priority under 35 U.S.C. § 119 of U.S. Provisional Application Ser. No. 62/087,406 filed on Dec. 4, 2014 the content of which is relied upon and incorporated herein by reference in its entirety.

TECHNICAL FIELD

Embodiments of the present disclosure are generally related to glass cutting systems and methods, and are specifically related to glass cutting systems and methods which utilize multiple non-diffracting sub-beams.

BACKGROUND

Focused short-pulsed laser beams are used for cutting and modifying transparent substrates, such as glass, through the process of nonlinear absorption via multi-photon ionization and subsequent ablation. Such laser systems must thus deliver a very small spot size and have high repetition rates in order to process materials at significant speeds. Typically laser processing has used Gaussian laser beams. The tight focus of a laser beam with a Gaussian intensity profile has a Rayleigh range $Z_R$ given by:

$$Z_R = \frac{\pi n_o w_o^2}{\lambda_o} \quad (1)$$

The Rayleigh range represents the distance over which the spot size $w_o$ of the beam will increase by $\sqrt{2}$ in a material of refractive index $n_o$ at wavelength $\lambda_0$. This limitation is imposed by diffraction. As shown in Eqn. 1 above, the Rayleigh range is related directly to the spot size, thus a tight focus (i.e. small spot size) cannot have a long Rayleigh range. Thus, the small spot size is maintained for an unsuitably short distance. If such a beam is used to drill through a material by changing the depth of the focal region, the rapid expansion of the spot on either side of the focus will require a large region free of optical distortion that might limit the focus properties of the beam. Such a short Rayleigh range also requires multiple pulses to cut through a thick sample.

Another approach to maintaining a tightly focused beam in a material is to use nonlinear filamentation via the Kerr effect, which yields a self-focusing phenomenon. In this process, the nonlinear Kerr effect causes the index at the center of the beam to increase, thereby creating a waveguide that counteracts the diffraction effect described above. The beam size can be maintained over a much longer length than that given in Eq. 1 above and is no longer susceptible to surface phase distortions because the focus is defined at the surface. To produce a sufficient Kerr effect, the power of the incident laser beam must exceed a critical value given by equation 2 below:

$$P_{Cr} = \frac{3.72\lambda_o^2}{8\pi n_o n_2} \quad (2)$$

where $n_2$ is the second-order nonlinear refractive index.

Despite the benefit of this extended focal range, generating beams in accordance with the Kerr effect undesirably requires much more power than the above described Gaussian beam approach.

Accordingly, there is a continual need for a beam generation method in a laser cutting system which achieves a beam(s) having a controlled spot size, longer focal length, while minimizing power requirements and increasing process speed.

SUMMARY

Embodiments of the present disclosure are directed to glass cutting systems and methods for cutting glass articles with optical non-diffracting beams (NDB), specifically "complex" NDB beams having multiple-NDB sub-beams. This approach maintains the high intensities required to sustain the multi-photon absorption, and achieves beam propagation for a considerable distance before diffraction effects inevitably limit the beam focus. Additionally, the central lobe of the beam can be quite small in radius, and thus produce a high intensity beam with a controlled spot size. The approach of using NDBs combines the benefits of the lower power associated with a Gaussian beam approach and the long focal range achieved by the filamentation process (Kerr effect).

Moreover, the present NDB embodiments may advantageously increase process speeds and lower operating costs, because it minimizes the number of pulses to cut through a substrate. The present optical system produces multiple simultaneous sub-beams from a single input beam pulse and thereby creates multiple damage spots or holes in a glass article from each pulse. A significant improvement in the cutting speed may be achieved when compared to a single beam method which delivers only one damage spot per pulse.

According to one embodiment, a system for laser cutting at least one glass article is provided. The system comprises a pulsed laser assembly and a glass support assembly configured to support the glass article during laser cutting within the pulsed laser assembly. The pulsed laser assembly comprises at least one quasi-NDB beam forming optical element configured to convert an input beam into a quasi-NDB beam, and at least one beam transforming element configured to convert the quasi-NDB beam into multiple quasi-NDB sub-beams spaced apart a distance of about 1 μm to about 500 μm. The pulsed laser assembly is oriented to deliver one or more pulses of multiple quasi-NDB sub-beams onto a surface of the glass article, wherein each pulse of multiple quasi-NDB sub-beams is operable to cut a plurality of perforations in the glass article.

According to another embodiment, a method of laser cutting a glass article is provided. The method comprises feeding at least one glass article to a pulsed laser system that produces multiple quasi-non-diffracting beams (NDB) spaced apart a distance of about 1 μm to about 500 μm for every pulse, laser cutting the at least one glass article using the multiple quasi-NDB beams to achieve a plurality of perforations in the glass article, and separating the glass article along the perforations to yield a laser cut glass article.

According to yet another embodiment, another system for laser cutting at least one glass article is provided. The system comprises a pulsed laser assembly and a glass support assembly configured to support the glass article during laser cutting within the pulsed laser assembly. The pulsed laser assembly comprises at least one axicon configured to convert an input beam (e.g., a Gaussian beam) into a Bessel beam, first and second collimating lenses disposed downstream of the axicon, and at least one beam transforming element oriented between the first and second collimating lenses. The at least one beam transforming element is configured to convert the Bessel beam into multiple sub-Bessel beams which are parallel and spaced apart a distance of about 1 µm to about 500 µm. The pulsed laser assembly is oriented to deliver one or more pulses of multiple sub-Bessel beams onto a surface of the glass article, wherein each pulse of multiple sub-Bessel beams is operable to cut a plurality of perforations in the glass article. In one or more embodiments, the beam transforming element may be disposed proximate a Fourier-transform plane generated by the first collimating lens or oriented within a focal length of the second collimating lens.

BRIEF DESCRIPTION OF THE DRAWINGS

The following detailed description of specific embodiments of the present disclosure can be best understood when read in conjunction with the drawings enclosed herewith.

FIG. 1 is a schematic view of a Gaussian beam passing through the axicon to produce a quasi-NDB Bessel beam.

FIG. 2A is a schematic view of a glass cutting system in accordance with one or more embodiments of the present disclosure.

FIG. 3A is a graphical illustration of a computer simulation, the graphical illustration depicting a single-axis scan across the center of two Bessel sub-beams separated by 5.84 µm.

FIG. 5A is a graphical illustration of a computer simulation, the graphical illustration depicting a single-axis scan across the center of three Bessel sub-beams separated by 5.85 µm.

FIG. 5B is a graphical illustration of a computer simulation, the graphical illustration depicting a two-dimensional cross-section of the three Bessel sub-beams of FIG. 5A.

FIG. 6B is a graphical illustration of a computer simulation, the graphical illustration depicting a two-dimensional cross-section of the three Bessel sub-beams of FIG. 6A.

Figure 2B:
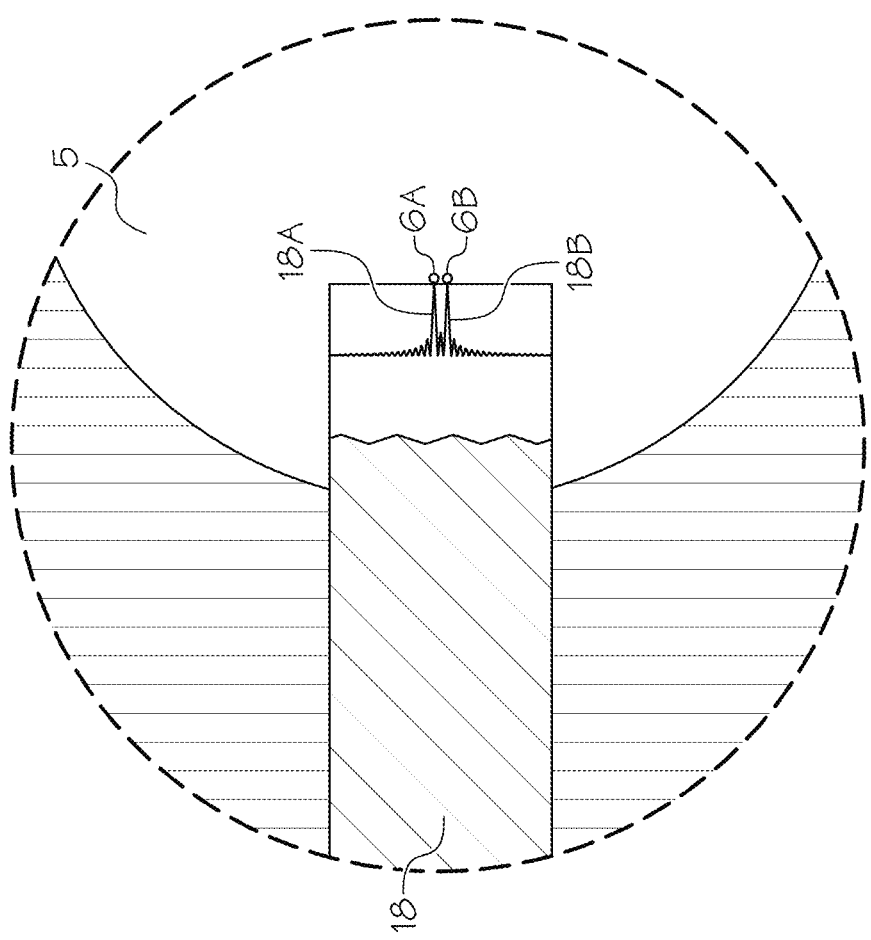
FIG. 2B is a close-up view of FIG. 2A depicting the laser cutting of the glass article in accordance with one or more embodiments of the present disclosure.

The embodiments set forth in the drawings are illustrative in nature and not intended to be limiting of the invention defined by the claims. Moreover, individual features of the drawings will be more fully apparent and understood in view of the detailed description.

DETAILED DESCRIPTION

Referring to the embodiments of the FIGS. 2A and 2B, a system 1 for laser cutting at least one glass article is shown. The system 1 comprises a pulsed laser assembly 10 and a glass support assembly 50 which supports the glass article 5 during laser cutting by the pulsed laser assembly 10. As shown in FIGS. 2A and 2B, the pulsed laser assembly 10 delivers one or more pulses of multiple quasi-NDB sub-beams 18A, 18B onto a surface of the glass article 5. Referring to FIG. 2B, the pulse (or complex beam) 18 of multiple quasi-NDB sub-beams 18A, 18B may cut a plurality of perforations 6A, 6B or in the glass article 5. As shown in the embodiment of FIG. 2A, the glass support assembly 50 is merely depicted as a conveyor; however, various other components such as a spindle chuck, robotic arm, etc are contemplated as suitable herein. These contemplated embodiments may cause the pulsed laser assembly 10 and the glass support assembly 50 to be moveable relative to one another during the laser cutting process.

Figure 7:
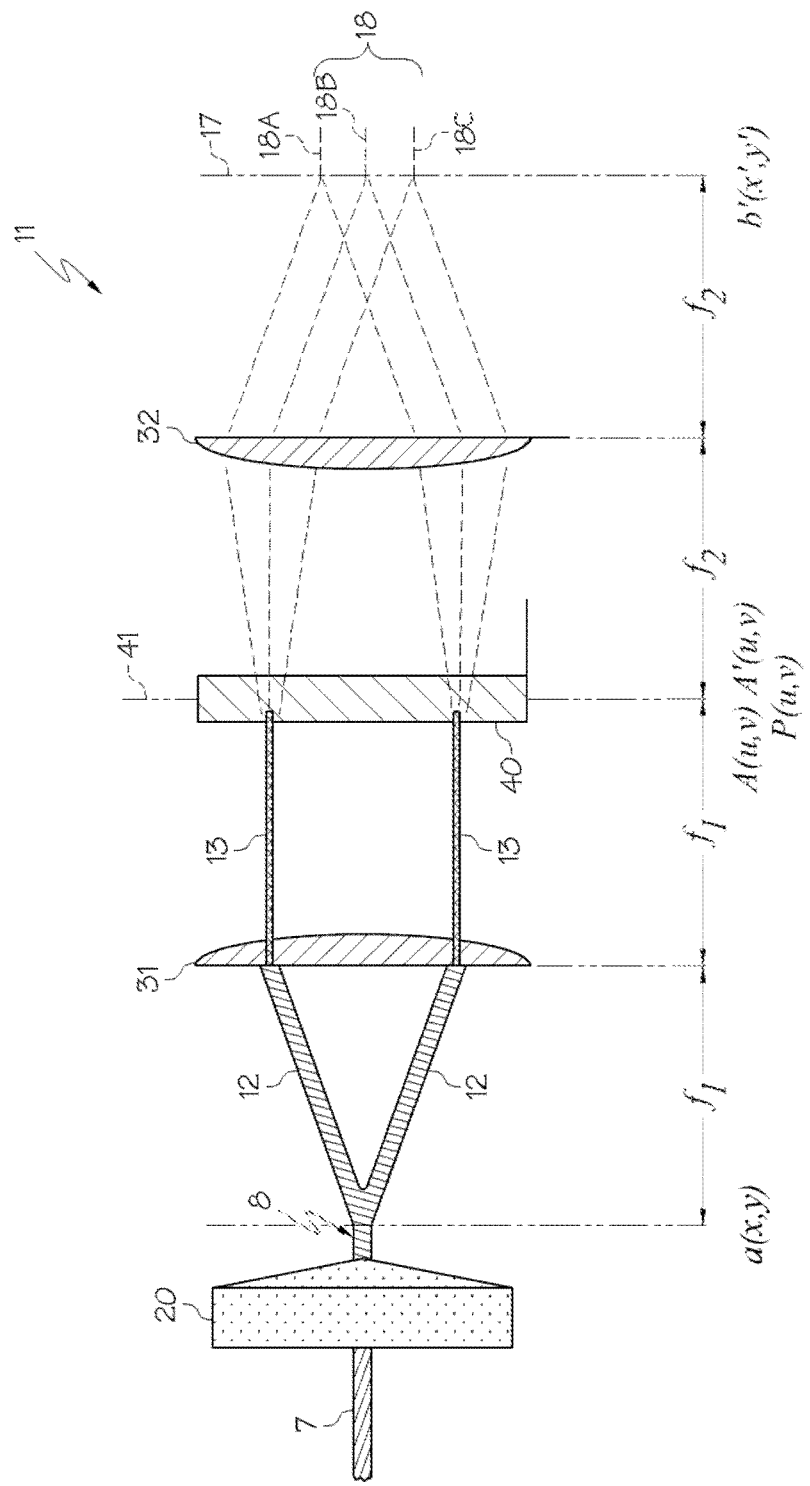
FIG. 7 is a schematic depiction of an optical assembly used in the pulsed laser assembly wherein the beam transforming element is oriented proximate the Fourier-transform plane of an upstream collimating lens according to one or more embodiments of the present disclosure.

Referring to FIG. 7, the pulsed laser assembly 10 comprises at least one NDB forming optical element 20 that converts an input beam 7 (e.g., a Gaussian beam) into a quasi-NDB beam 12 (See also FIG. 1), and at least one beam transforming element 40 which converts the quasi-NDB beam 12 into multiple quasi-NDB sub-beams 18A, 18B, 18C spaced apart a distance of about 1 µm to about 500 µm.

As used herein, "quasi-NDB beam" means a created non-diffracting beam, typically a nondiffracting beam created from the conversion of an input beam (e.g., a Gaussian beam) to a non-diffracting beam. The quasi-NDB beam could encompass many beam types. As used herein, "input beam" may include any beam having a substantially uniform optical phase. In one embodiment, the input beam is a Gaussian beam. For example, the quasi-NDB may include a Bessel beam, an Airy beam, a Weber beam, or a Mathieu beam. In the embodiments described below, the quasi-NDB beam is a Bessel beam. The conversion of a Gaussian beam 7 by an axicon NDB forming optical element 20 to a Bessel quasi-NDB beam 12 is shown in FIG. 1. FIG. 1 depicts a single pulse Gaussian beam; however, the Gaussian beam source may also deliver the Gaussian beam in multiple pulses. In addition to axicons, various other NDB forming optical elements are contemplated, for example, a spatial light modulator, an elliptical lens, or combinations thereof. Bessel beams may be readily produced by axicons; however, other quasi-NDB beams are produced with other NDB forming elements 20.

Figure 3B:
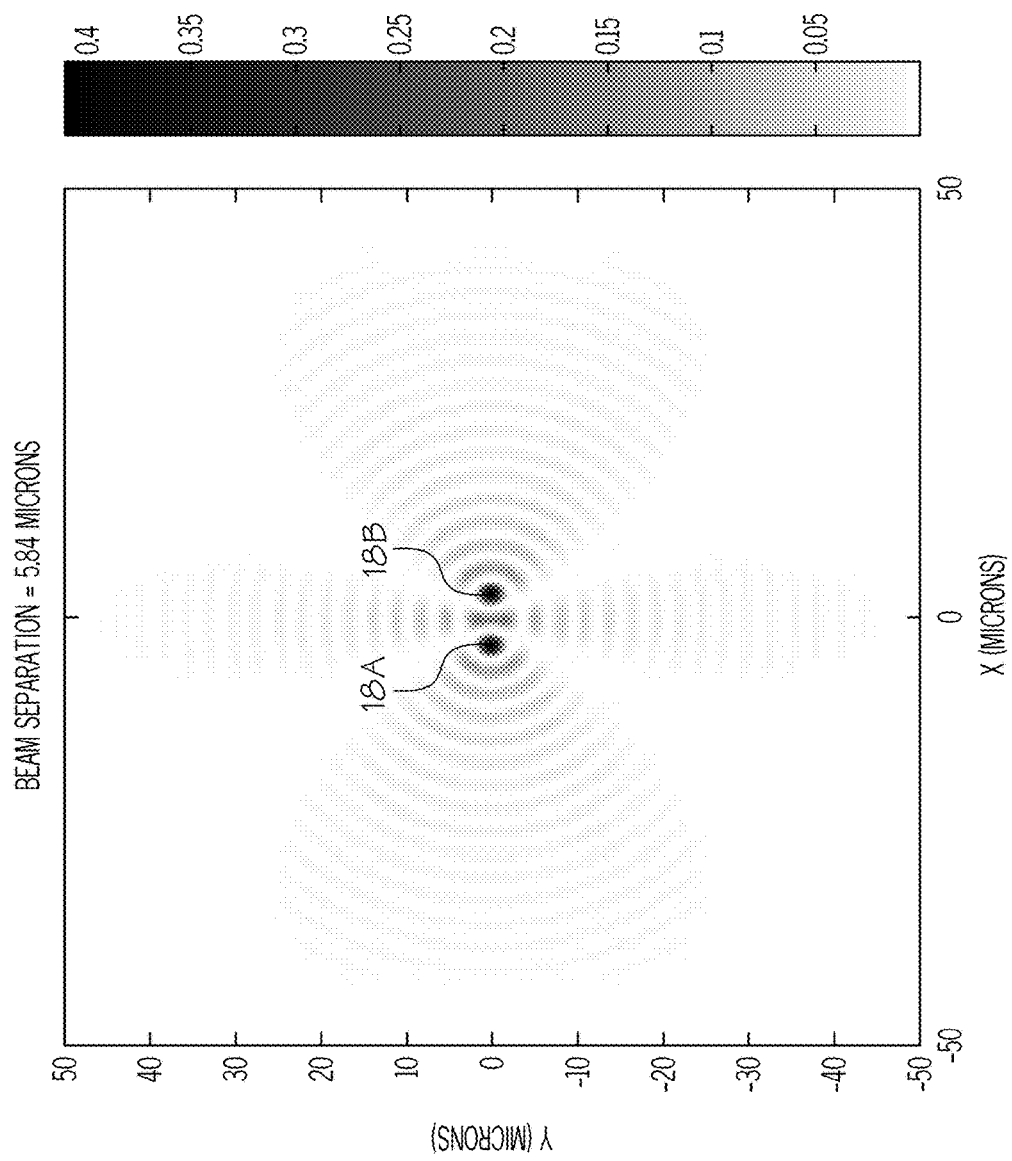
FIG. 3B is a graphical illustration of a computer simulation, the graphical illustration depicting a two-dimensional cross-section of the two Bessel sub-beams of FIG. 3A.
Figure 4A:
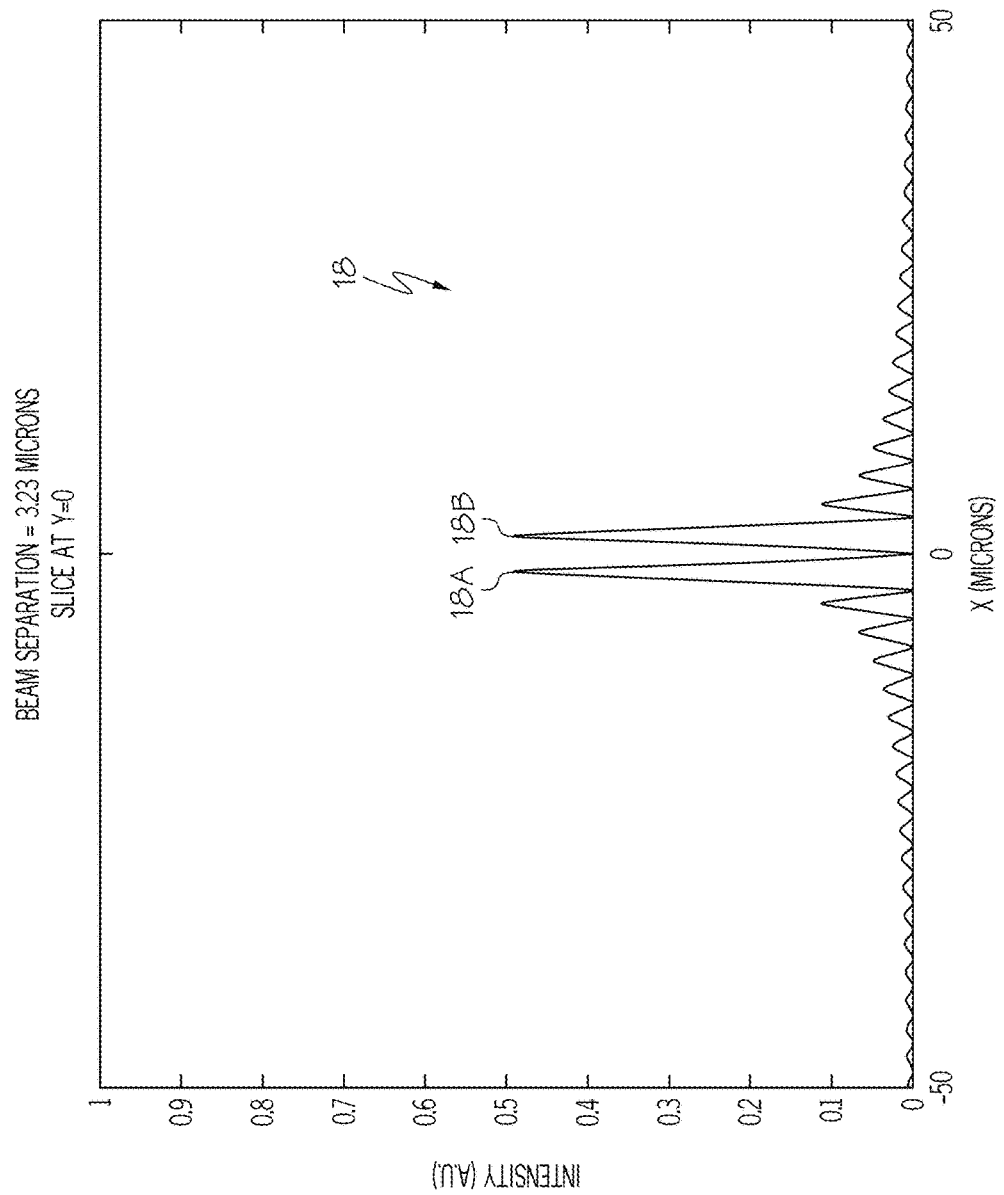
FIG. 4A is a graphical illustration of a computer simulation, the graphical illustration depicting a single-axis scan across the center of two Bessel sub-beams separated by 3.23 µm, wherein a π phase shift is added to one beam.
Figure 4B:
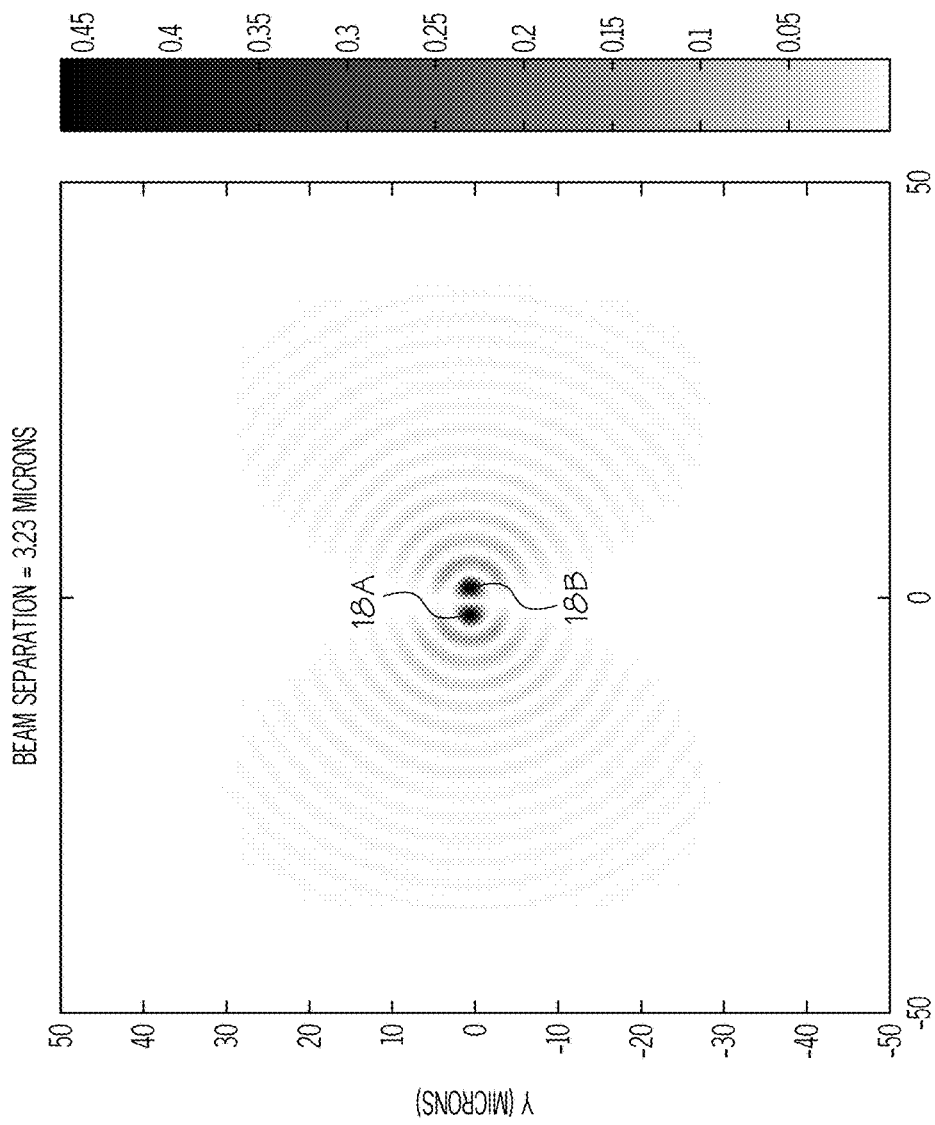
FIG. 4B is a graphical illustration of a computer simulation, the graphical illustration depicting a two-dimensional cross-section of the two Bessel sub-beams of FIG. 4A.

Further as used herein, "multiple quasi-NDB sub-beams" does not mean separate NDB laser beams. "Multiple quasi-NDB sub-beams" means a complex beam having a plurality of spots. Referring to FIG. 3A, the two peaks 18A and 18B are two quasi-NDB sub-beams in the complex Bessel beam depicted therein. As shown in FIG. 1, Bessel beams tend to have a central peak at zero, which would constitute its beam spot. However, in accordance with the present embodiments, the Bessel beam is converted in the beam transforming element 40, such that the Bessel beam with a single spot is transformed into a modified Bessel beam having two spots corresponding to peaks 18A and 18B. These two spots or two quasi-NDB sub-beams are depicted in cross-section in FIG. 3B. FIGS. 4A and 4B depict another embodiment having 2 quasi-NDB sub-beams, and FIGS. 5A-6B depict embodiments with 3 quasi-NDB sub-beams 18A, 18B, and 18C. While not shown, "multiple quasi-NDB sub-beams" encompasses complex beams having more than 2 or 3 quasi-NDB sub-beams.

Figure 8:
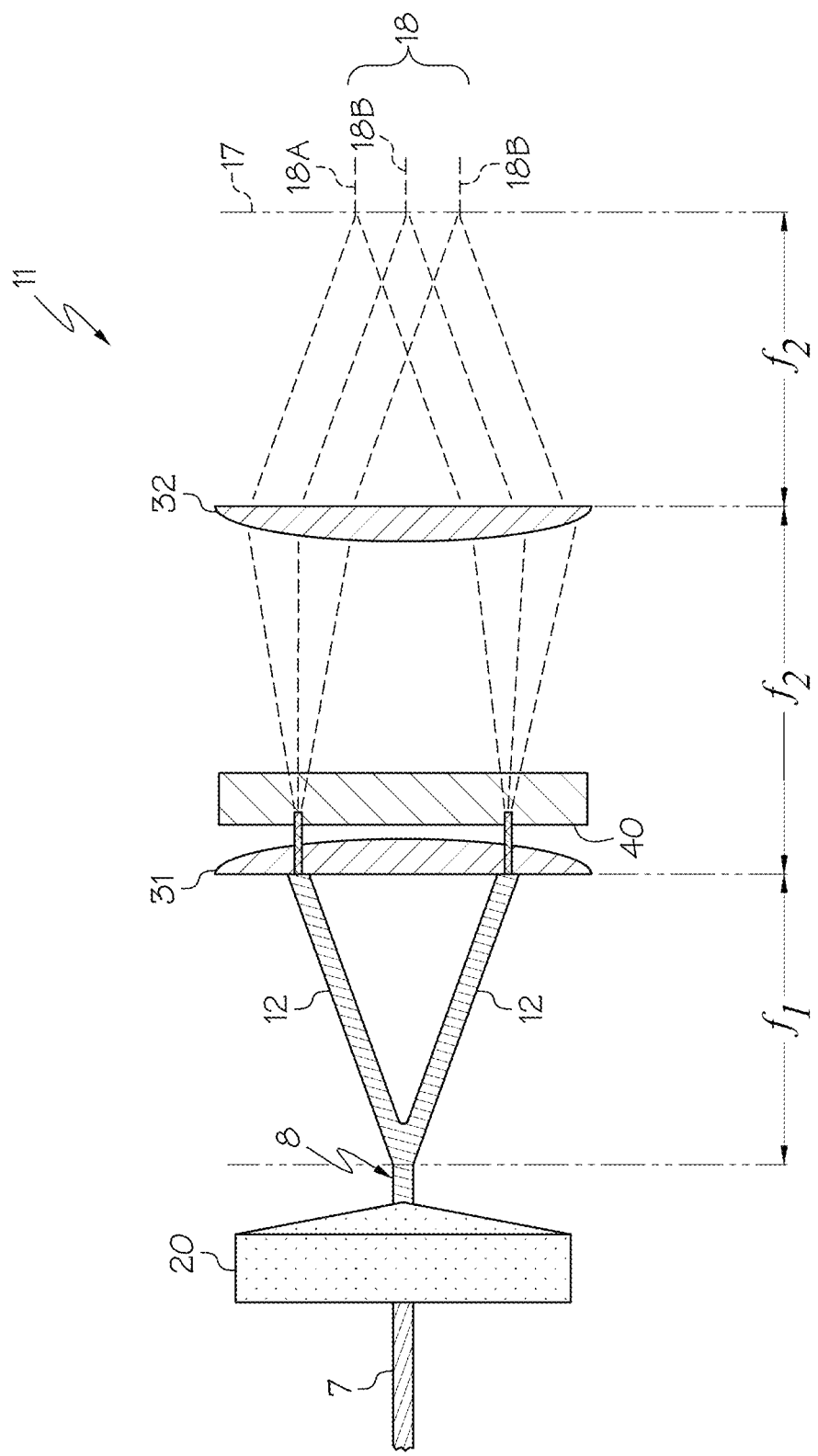
FIG. 8 is a schematic depiction of an optical assembly used in the pulsed laser assembly wherein the beam transforming element is oriented within a focal length of a downstream collimating lens according to one or more embodiments of the present disclosure.

Referring to FIGS. 7 and 8, the beam transforming element 40 converts a quasi-NDB beam 12 into multiple quasi-NDB sub-beams 18A, 18B, and 18C. The beam transformation essentially re-shapes the high intensity single quasi-NDB beam into multiple lower intensity sub-beams, which in most embodiments are spaced apart from one another. As shown in FIGS. 3A-6B, the multiple quasi-NDB sub-beams are depicted as being in parallel; however, it is contemplated that the multiple quasi-NDB sub-beams 18 could be angled such that they overlap with one another. In addition to generating the multiple quasi-NDB sub-beams, the beam transforming element 40 may optimize the spacing between the beams, and optionally may shift the phase of one or more of the multiple quasi-NDB sub-beams. By phase shifting the phase of at least one of the multiple quasi-NDB sub-beams, the intensity of the multiple quasi-NDB sub-beams may be added coherently. Depending on the glass cutting application, various spacings between sub-beams may be sought. For example, the spacing may be from about 1 µm to about 500 µm, or about 1 µm to about 200 µm, or about 1 µm to about 100 µm, or about 1 µm to about 50 µm, or about 1 µm to about 20 µm, or about 1 µm to about 10 µm, or about 1 µm to about 5 µm. Similarly, the degree of phase shift may vary with phase shifts ranging from about $\pi/4$ to about $2\pi$, or about $\pi/2$ to about $\pi$ being contemplated.

The beam transforming element 40 may comprise various components. For example and not by way of limitation, the beam transforming elements may comprise is a phase grating or phase plate, an amplitude grating, or combinations thereof. In specific embodiment, it may be beneficial to include a beam transforming element 40 which is a combination of a phase element and an amplitude grating element. These gratings may be square wave or sinusoidal; however, other complex shapes are contemplated herein. A further discussion of beam transforming elements 40 is provided below.

An amplitude-only grating may be defined by the following equation:

$$P_{tot}(u, v) = 0.5 + 0.5 * \cos\left(\frac{2\pi u}{T}\right) \quad (3)$$

Physically, this would be a much easier grating to make, because no phase shift is required; however, such a grating may produces many order sub-beams, for example, a zeroth-order sub-beam and two first-order sub-beams. Thus, in some embodiments, a phase shift may be utilized to substantially limit the sub-beams to a single order.

Phase-only gratings may be formed from a thickness or index grating in glass or using a programmable spatial light modulator. A square phase-only grating can more efficiently couple light into the sub-beams. For two sub-beams, the most efficient phase-only grating may be defined by:

$$P_{tot}(u, v) = e^{i\phi_o rect\left(\frac{2\pi u}{T}\right)} \quad (4)$$

Where $$\phi_o = \frac{\pi}{2} \text{ and } rect\left(\frac{2\pi u}{T}\right)$$

is a square-wave function of u oscillating between −1 and +1 with a period of T. With the square grating, additional diffraction orders may be present, but with the correct choice of phase amplitude they can be minimized. With the sinusoidal amplitude grating, there are only the two first-order sub-beams.

To generate a third sub-beam, it is possible to use $$\phi_o = a\tan\left(\frac{\pi}{2}\right) \sim 1 \text{ rad}$$

to give:

$$P_{tot}(u, v) = e^{i rect\left(\frac{2\pi u}{T}\right)} \quad (5)$$

which results in three sub-beams.

In one or more embodiments, static phase elements can be made to various scales. However, it may be desirable to use programmable phase elements such as acousto-optic modulators (AOM), electro-optic modulators (EOM), spatial light modulators (SLM) and digital micro-mirror arrays (DMA).

Without being bound by theory, sub-beam spacings that preserve the characteristics of the input beam 7 are beneficial. As an example, a discussion regarding combining two zeroth-order Bessel sub-beams is provided below. This approach can be used for finding the optimal spacings for other quasi-NBD sub-beams As shown in FIG. 1, the Bessel function $J_0(x)$ is an oscillatory function (positive and negative) about zero. If two Bessel functions are added coherently with a lateral offset, they will interfere destructively when a positive peak in one function overlaps with a negative peak in the second function. Similarly, the beams will add constructively when two positive peaks add. The locations of the positive maxima and negative minima of the function $J_0(x)$ are given by the zeros of the higher-order Bessel function $J_1(x)$ (through a well-known relationship that $dJ_0(x)/dx=-J_1(x)$). These zeros $\beta_j$ are well known and the first few are given in Table 1 below. For roots beyond those shown in Table 1, the roots become equally spaced by $\sim\pi$, so simply add multiples of $\pi=3.14159$ to the $7^{th}$ root.

The equation for optimal $\Delta x_{opt}$ that optimizes the peak intensity of the sub-beams may be defined as:

$$\Delta x_{opt,j} = \frac{\beta_j}{k_r} \quad (6)$$

where:

-continued $$k_r = k \cdot NA = \frac{2\pi n_o}{\lambda_o} \cdot NA = \frac{2\pi n_o}{\lambda_o} \cdot \sin(\beta). \quad (7)$$

For $\lambda_0=1.06$ µm in air with numerical aperture (NA)=0.2 (or $\beta=11.5°$), we find $k_r=1.1855$ µm$^{-1}$ and the resulting optimal spacing is given in the 4$^{th}$ column of Table 1 while column 5 gives the spacing for NA=0.1 (narrow cone angle of $\beta=5.7°$). When the sub-beams are added with no phase shift between them, we use the odd roots j=3, 5, etc.

An alternative approach for generating two sub-beams would be to add the two coherent sub-beams with a phase shift between them. If we add a π shift to the relative optical phase, this is equivalent to multiplying one of the sub-beams by a minus sign. Thus the positive peaks of one sub-beam will add coherently to the negative peaks of the second sub-beam. This allows for efficient sub-beam separations at the spacings labeled "N" in the third column of Table 1, corresponding to the even roots j=2, 4, etc.

TABLE 1

| j$^{th}$ Root | J1 zero, $\beta_j$ | Peak sign | Example $\Delta x_{opt}$ (µm) NA = 0.2 $k_r$ = 1.1855 µm$^{-1}$ | Example $\Delta x_{opt}$ (µm) NA = 0.1 $k_r$ = 0.5928 µm$^{-1}$ |
|---|---|---|---|---|
| 1 | 0 | P | 0.00 | 0.00 |
| 2 | 3.8317 | N | 3.23 | 6.46 |
| 3 | 7.0156 | P | 5.92 | 11.84 |
| 4 | 10.1735 | N | 8.58 | 17.16 |
| 5 | 13.3237 | P | 11.24 | 22.48 |
| 6 | 16.4706 | N | 13.89 | 27.79 |
| 7 | 19.6159 | P | 16.55 | 33.09 |

Figure 6A:
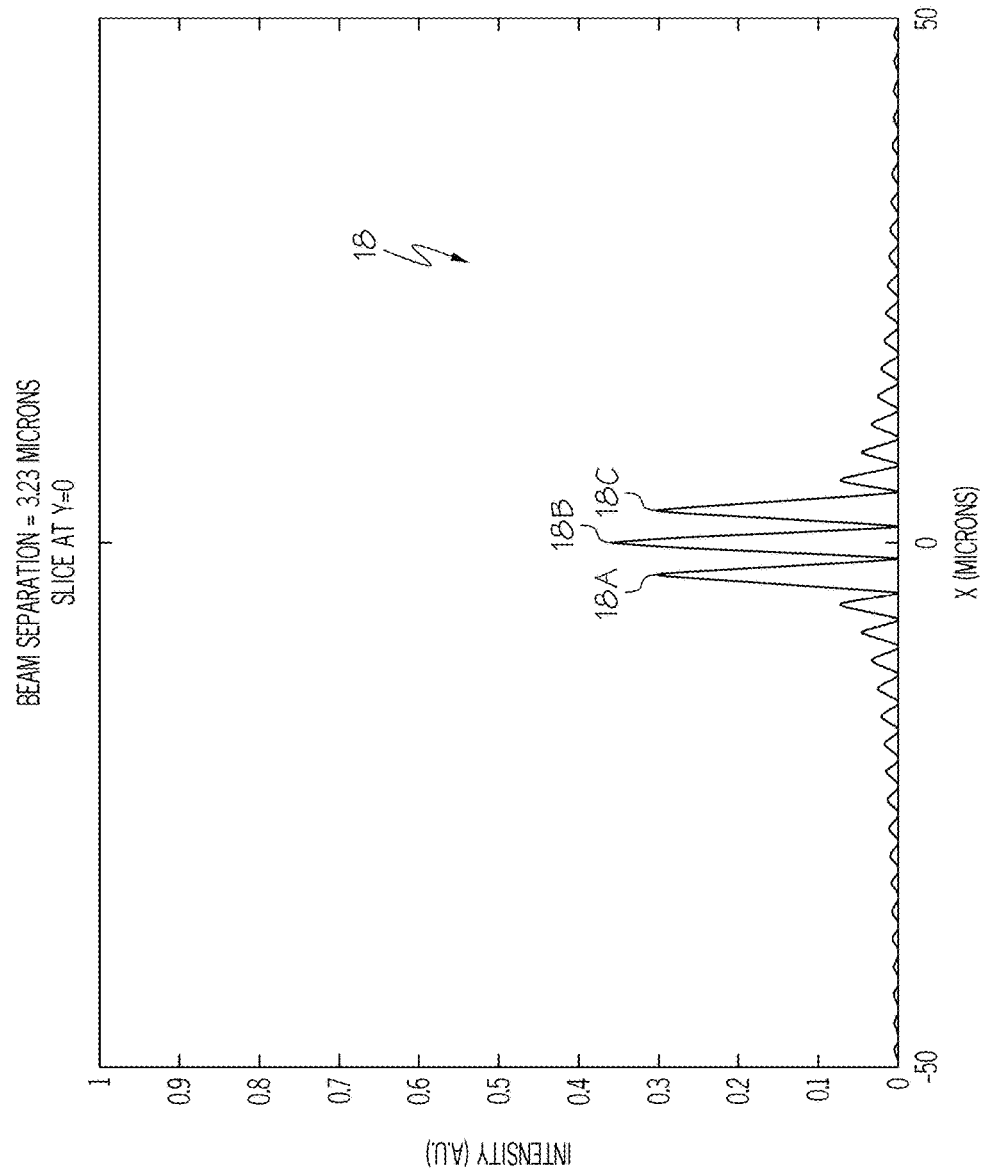
FIG. 6A is a graphical illustration of a computer simulation, the graphical illustration depicting a single-axis scan across the center of three Bessel sub-beams separated by 3.23 µm, wherein a π phase shift is added to one beam.

For illustration, FIG. 3A depicts two spaced quasi-NDB sub-beams, and FIG. 4A shows the two spaced quasi-NDB sub-beams but with a 7C phase shifted added to one of the beams. Both FIGS. 3A and 4A show optimal separations for which the sub-beam intensity is locally maximized. The out-of-phase beams in FIG. 4A can be placed very close together (~3 microns). This is important in the cutting of transparent substrates for creating nearly continuous damage zones. Similarly, FIG. 5A depicts three spaced quasi-NDB sub-beams 18A, 18B, and 18C, and FIG. 6A shows three spaced quasi-NDB sub-beams but with a π phase shift added to the central beam 18B.

For non-optimal spacing, the peak intensity is not maximized, but such spacings may still produce acceptable cutting behavior as long as sufficient laser power is available to achieve nonlinear material damage.

Referring to the embodiments of FIG. 7-10, specific optical assembly 11 arrangements for the pulsed laser assembly 10 are depicted therein. As shown in FIGS. 7 and 8, the optical assembly 11 may comprise at least one collimating lens 31 configured to narrow the quasi-NDB beam 12 from the at least one NDB forming optical element 20.

Further as shown in FIG. 7, the beam transforming element 40 may be oriented downstream of the collimating lens 31. In a further embodiment, the beam transforming element 40 may be oriented proximate a Fourier-transform plane 41 produced by the collimating lens 31. It is also contemplated to place the beam transforming element 40 at a location not proximate or within the Fourier-transform plane 41. Moreover as shown in FIG. 7, the optical assembly 11 may further comprise at least one additional collimating lens 32 downstream of the beam transforming element 40 which focus the multiple quasi-NDB sub-beams 18A, 18B, and 18C.

Referring again to the embodiment of FIG. 7, when the beam transforming element 40 is oriented behind the Fourier-transform plane 41 of collimating lens 31, the field A(u,v) at Fourier-transform plane 41 is multiplied by a transfer function P(u,v) to produce a new field A'(u,v) with two new angular components which are then imaged by collimating lens 32 to an image plane 17 to produce three quasi NDB sub-beams 18A, 18B, and 18C. The rays after beam transforming element 40 are depicted with dashed lines to indicate that the optical field in this region is a function beam transforming element 40

As shown in the embodiment of FIG. 7, the focus 8 of the input beam 7 is placed in front of the first collimating lens 31 at a distance $f_1$, where $f_1$ is the focal length of the first collimating lens 31. A second lens 32 with a second focal length $f_2$ is placed a distance of $f_1+f_2$ behind the first lens 31. The Fourier-transform plane 41 at a distance of $f_1$ behind the first lens 31 is the Fourier-transform plane of the first lens 31 and the optical field at this plane is known to be the optical Fourier transform A(u,v) of the input field a(x,y) at a distance $f_1$ in front of collimated lens 31:

$$A(u, v) = \int\int_{-\infty}^{\infty} \frac{a(x, y)}{i\lambda f_1} e^{\frac{-2\pi n i}{\lambda f_1}(xu+yv)} dx dy \quad (8)$$

The purpose of the second lens 32 is to take the inverse Fourier transform of the optical field A(u,v) in Fourier-transform plane 41 and form an image b(x',y') of the input beam in image plane 17. It can be shown that:

$$b(x', y') = \int\int_{-\infty}^{\infty} \frac{A(u, v)}{i\lambda f_2} e^{\frac{-2\pi n i}{\lambda f_2}(ux'+vy')} du dv \quad (9a)$$

$$= \frac{f_1}{f_2} a\left(-\frac{f_1}{f_2}x', -\frac{f_1}{f_2}y'\right) \quad (9b)$$

$$= M a(-Mx', -My') \quad (9c)$$

If $f_1 \neq f_2$, the image will have a magnification M≠1 and the quasi NDB sub-beams may not be parallel. If $f_1=f_2$, the image will have a magnification M=1 and the quasi NDB sub-beams will be parallel.

Introducing the beam transforming element 40 in the Fourier-transform plane 41 has the effect of multiplying the Fourier-transform of the input field by the transfer function of this element:

$$b'(x', y') = \int\int_{-\infty}^{\infty} \frac{A'(u, v)}{i\lambda f_2} e^{\frac{-2\pi n i}{\lambda f_2}(ux'+vy')} du dv \quad (10a)$$

$$= \int\int_{-\infty}^{\infty} \frac{A(u, v) P(u, v)}{i\lambda f_2} e^{\frac{-2\pi n i}{\lambda f_2}(ux'+vy')} du dv \quad (10b)$$

It is known that certain optical elements can shift an input beam in an arbitrary direction, can impart a tilt to the focal region, and can scale the amplitude of the output beam. Other elements and apertures can be used to filter unwanted spatial frequencies from the beam in order to mitigate or create impairments to the optical beam. In this disclosure, we will focus on the lateral shifting of quasi-NDB sub-beams to generate multiple quasi NDB sub-beams.

The phase transformation to accomplish a lateral shift $(\Delta x, \Delta y)$ is:

$$P(u, v) = e^{\frac{2\pi n i}{\lambda f_2}(u\Delta x' + v\Delta y')} \tag{11}$$

From above it can be seen that:

$$b'(x', y') = \int\int_{-\infty}^{\infty} \frac{A(u,v)P(u,v)}{i\lambda f_2} e^{\frac{-2\pi n i}{\lambda f_2}(ux' + vy')} du\, dv \tag{12a}$$

$$= \int\int_{-\infty}^{\infty} \frac{A(u,v)}{i\lambda f_2} e^{\frac{2\pi n i}{\lambda f_2}(u\Delta x + v\Delta y)} e^{\frac{-2\pi n i}{\lambda f_2}(ux' + vy')} du\, dv \tag{12b}$$

$$= Ma\{-M(x' - \Delta x), -M(y' - \Delta y)\} \tag{12c}$$

Thus, the output field $b'(x',y')$ in image plane 17 is a scaled and shifted version of the input field $a(x,y)$.

It is also known that multiple quasi-NDB sub beams can be produced by summing different phase shifts:

$$P_{tot}(u, v) = \frac{1}{\sum_{j=1}^{N} |c_j|} \sum_{j=1}^{N} c_j e^{\frac{2\pi n i}{\lambda f_2}(u\Delta x_j + v\Delta y_j)} \tag{13}$$

For the special case of two equal beams, $N=2$ spaced by $x_o$:

$$P_{tot}(u, v) = \frac{1}{2}\left[e^{\frac{2\pi n i}{\lambda f_2}\left(u\frac{\Delta x_0}{2}\right)} + e^{\frac{-2\pi n i}{\lambda f_2}\left(u\frac{\Delta x_0}{2}\right)}\right] \tag{14a}$$

$$= \cos\left(\frac{2\pi n}{\lambda f_2}\left(u\frac{\Delta x_0}{2}\right)\right) \tag{14b}$$

$$= \cos\left(\frac{2\pi u}{T}\right) \tag{14c}$$

where $$T = \frac{2\lambda f_2}{n\Delta x_0}.$$

In this instance, $P_{tot}(u,v)$ is simply a cosinusoidal amplitude diffraction grating of period T. When a phase shift is introduced between the two beams we find:

$$P_{tot}(u, v) = \frac{1}{2}\left[e^{i\phi}e^{\frac{2\pi n i}{\lambda f_2}\left(u\frac{\Delta x_0}{2}\right)} + e^{\frac{-2\pi n i}{\lambda f_2}\left(u\frac{\Delta x_0}{2}\right)}\right] \tag{15a}$$

$$= \cos\left(\frac{2\pi u}{T} + \frac{\phi}{2}\right) \tag{15b}$$

So that a phase shift of $\phi=\pi$ between the sub-beams adds a phase of $\phi/2$ to the cosine which makes it a sine function. Practically, this corresponds to a lateral shift of the grating by a quarter of a period or T/4.

In addition to the arrangement of FIG. 7, the NBD forming optical element 20 (e.g., axicon) may be at a distance greater or less than the focal length f1 of lens 31. This may lead to an uncollimated region between the collimating lenses 31 and 32, and thus may impact the choice of the beam transforming element 40. Additionally, various distances are contemplated between collimating lenses 31 and 32. For example, the distance between collimating lenses 31 and 32 differ may be greater or less than f1+f2.

Alternatively, the embodiments above describe the positioning of the beam transforming element 40 after lens 31; however, various other positions are also contemplated. For example, and not by way of limitation, the beam transforming element 40 may be positioned before collimating lens 31 or after collimating lens 32.

Various additional optical assemblies are also contemplated herein. In the embodiment of FIG. 8, the optical assembly may also include the beam transforming element 40 within the focal length ($f_2$) of collimating lens 32, which is downstream of the beam transforming element 40. As shown, this may be achieved by placing the beam transforming element 40 in close proximity to collimating lens 31, which is upstream of the beam transforming element 40.

Figure 9:
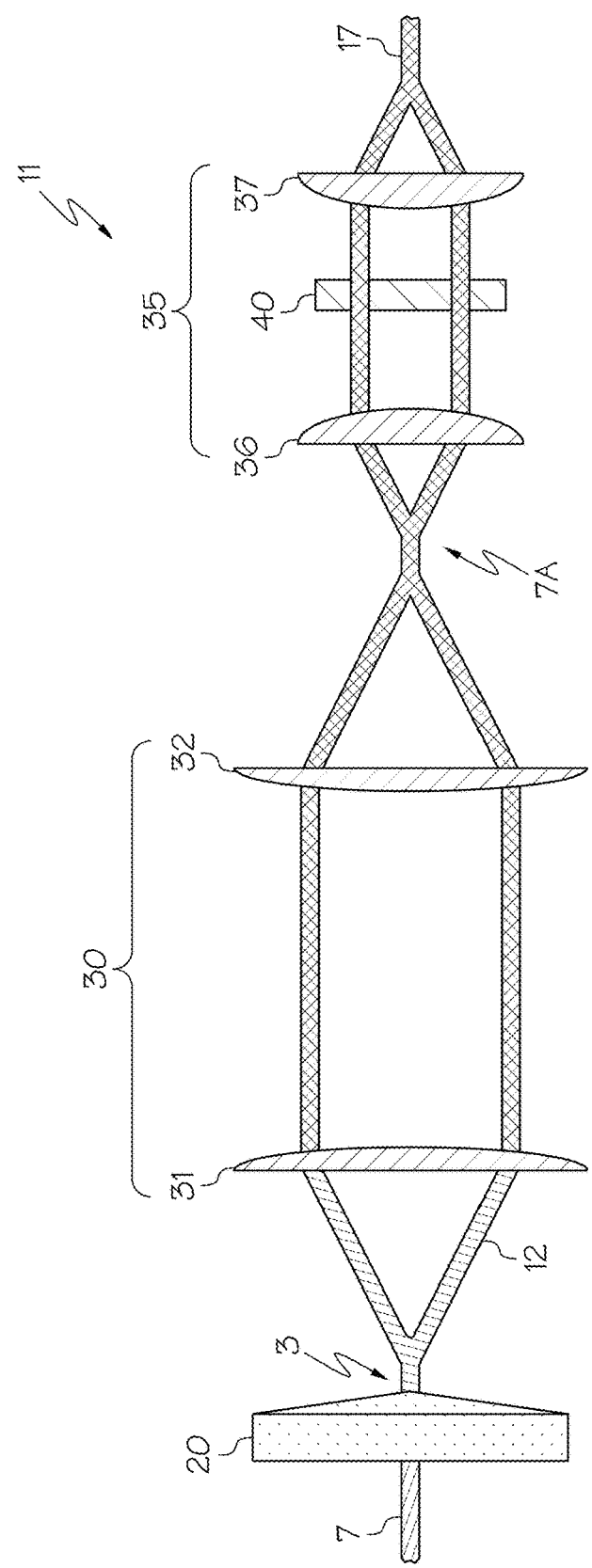
FIG. 9 is a schematic depiction of an alternative optical assembly with smaller optical elements according to one or more embodiments of the present disclosure.

In an additional embodiment depicted in FIG. 9, the optical assembly 11 may comprise comprising multiple collimated regions 30 and 35. In the embodiment of FIG. 9, the multiple collimated regions 30 and 35 include a large collimated region 30 and a small collimated region 35 downstream of the large collimated region 30. The large collimated region 30 may include one or multiple collimating lenses 31 and 32 that narrow the NDB beam from the at least one NDB forming optical element 20. Moreover, the optical assembly 11 may include a small collimated region 35 downstream of the large collimated region 30 which narrows the quasi-NDB beam from the prior to splitting in the beam transforming element 40. The small collimated region 35 includes one or a plurality of collimating lenses 36 and 37. While the beam transforming element 40 is disposed in the small collimated region 35 in the embodiment of FIG. 9, it is contemplated that the beam transforming element 40 may be disposed in the large collimated region 30.

Without being bound by theory, having two collimating regions 30 and 35 as shown in FIG. 9 is useful to accommodate a Bessel beam Rayleigh range optimized for large diameter beams with large numerical apertures. For example, the diameter of the beam between collimating lens 31 and collimating lens 32 is large e.g., 10-30 mm. Thus, to provide small focal spots, it may be necessary to include the small collimated region 35 that is small in diameter.

Figure 10:
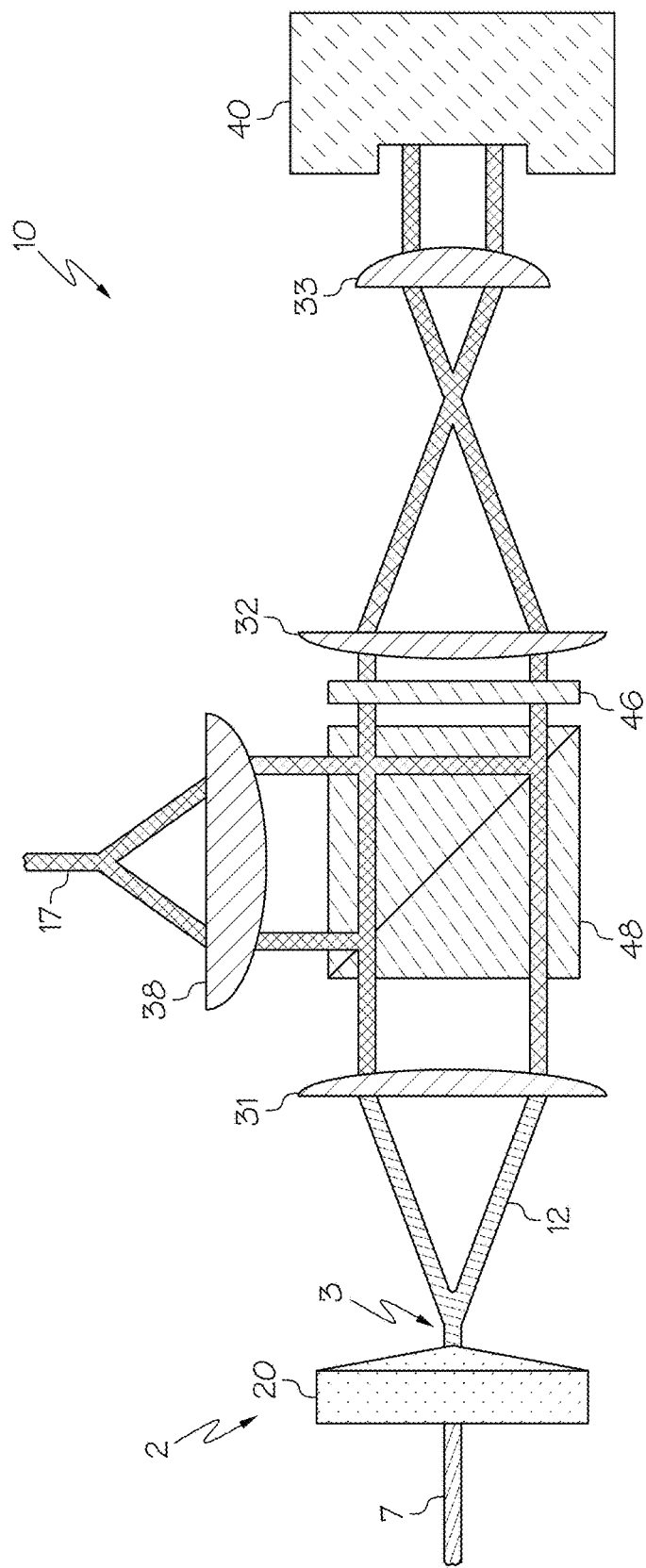
FIG. 10 is a schematic depiction of yet another optical assembly with a reflective optical element according to one or more embodiments of the present disclosure.

Referring to FIG. 10, an alternative optical assembly may include a reflective beam transforming element 40. In this instance, after the input beam 7 is converted by an axicon 20 into a quasi-NDB beam 12, it is linearly polarized and passes through a polarizing beam splitter 48 in the collimating region between collimating lenses 31 and 32. The quasi-NDB beam 12 then passes through a quarter wave plate 46 to become circularly polarized before being recollimated with demagnification by collimating lenses 32 and 33. The quasi-NDB beam 12 is converted into multiple quasi-NDB-beams, which are then retroreflected off the reflective beam transforming element 40 and back through collimating lenses 33 and 32. The multiple quasi-NDB-beams are further rotated in polarization by the quarter wave plate 46 and thereby achieve the opposite linear polarization to input beam 7. This new polarization is reflected by beam splitter 48 and the beam is focused to its final size by collimating lens 38.

As stated above, it is also anticipated that the optical assemblies may have apertures to block unwanted light from reaching the image plane 17. This may be the case with phase only gratings that have higher-order diffraction patterns. The magnification of the final image is dependent on the choice of focal lengths. Without being bound by theory, the target beam spacing is specified in the image plane and can thus be tuned by both the grating and the optical magnification.

Turning now to glass cutting applications, the present embodiments may yield improved formation of single lines of damage (i.e., perforations) and improved formation of multiple lines to form arrays of damage sites.

In the case of the single damage line, the multiple sub-beams are aligned with the scan direction of the laser. For example, if a 100 kHz laser system is used to create damage sites spaced at 3 microns, a single beam optical system could be scanned 3 microns every 10 microseconds for a cutting speed of 0.5 m/s. However, with 3 sub-beams, the same system could run at 1.5 m/s by moving the compound beam spot by 9 microns in the same 10-microsecond time interval.

Figure 11:
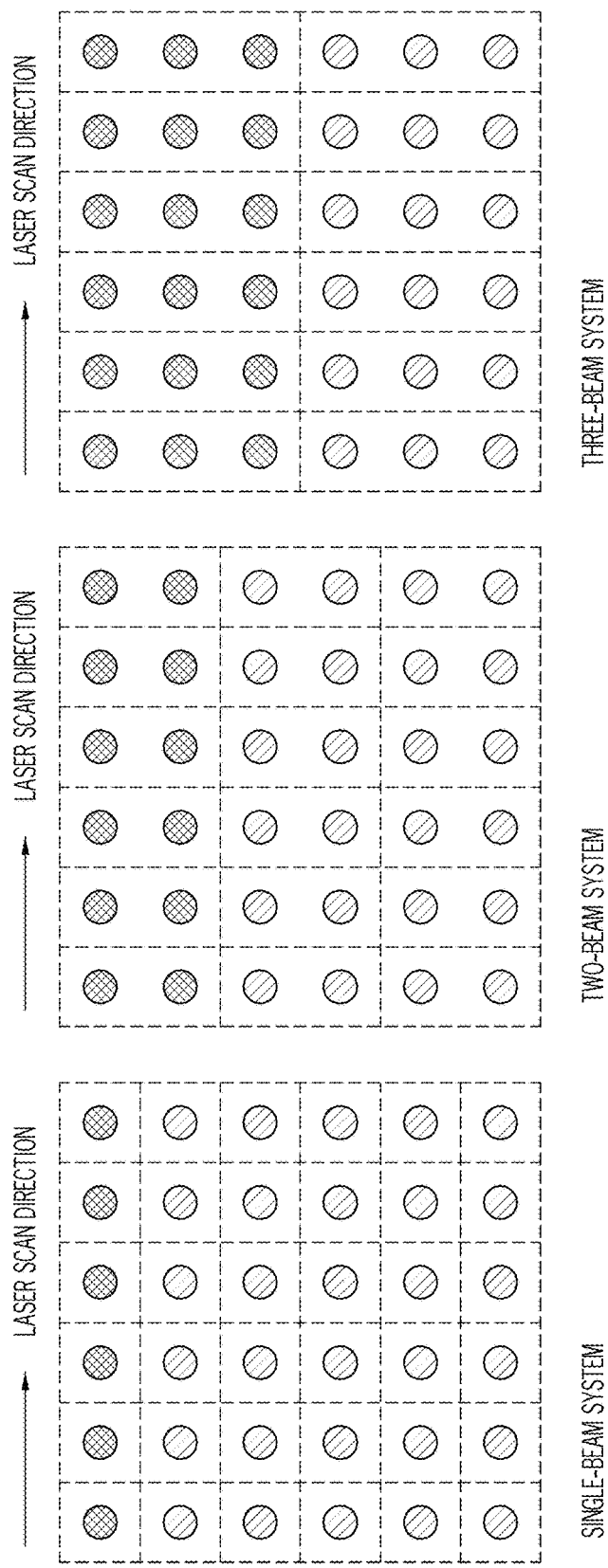
FIG. 11 is a schematic depiction comparing damage spots produced by one, two, and three beam systems.

In the case of the multiple damage lines for array applications as depicted in FIG. 11, the multiple sub-beams are aligned orthogonally to the scan direction of the laser. For example as depicted in FIG. 11, if a 100 kHz laser system is used to create a 10,000×10,000 damage sites spaced at 10 microns, a single beam optical system would require 1000 seconds to create the array. A three sub-beam system could finish the same task in 334 seconds.

As would be familiar to one of skill in the art, various other components are contemplated for the laser cutting assembly. For example, the laser cutting assembly may include some mechanism for separating the glass article along the perforations to yield a laser cut glass article. This may include thermal shock devices, cracking beams, etc.

It is further noted that terms like "preferably," "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present disclosure.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

What is claimed is:

1. A system for laser cutting at least one glass article comprising a pulsed laser assembly and a glass support assembly configured to support the glass article during laser cutting within the pulsed laser assembly, wherein the pulsed laser assembly comprises
    at least one non-diffracting beam forming optical element configured to convert an input beam into a quasi-non-diffracting beam; and
    at least one beam transforming element configured to convert the quasi-non-diffracting beam into multiple quasi-non-diffracting sub-beams spaced apart a distance of about 1 µm to about 500 µm;
    wherein the pulsed laser assembly is oriented to deliver one or more pulses of the multiple quasi-non-diffracting sub-beams onto a surface of the glass article, wherein each of the one or more pulses of multiple quasi-non-diffracting sub-beams is operable to cut a plurality of perforations in the glass article.

2. The system of claim 1 further comprising at least one collimating lens configured to narrow the quasi-non-diffracting beam from the at least one non-diffracting beam forming optical element.

3. The system of claim 2 wherein the beam transforming element is oriented downstream of the collimating lens.

4. The system of claim 3 wherein the beam transforming element is oriented proximate a Fourier-transform plane produced by the collimating lens.

5. The system of claim 1 further comprising at least one additional collimating lens downstream of the beam transforming element and configured to focus the multiple quasi-non-diffracting sub-beams.

6. The system of claim 5 wherein the beam transforming element is oriented within a focal length of the additional collimating lens.

7. The system of claim 1 wherein the input beam is a Gaussian beam.

8. The system of claim 1 wherein the multiple quasi-non-diffracting sub-beams are parallel to one another and spaced apart a distance of about 1 µm to about 20 µm.

9. The system of claim 1 wherein the beam transforming element is chosen from a phase grating, an amplitude grating, or combinations thereof, and the non-diffracting beam forming optical element is chosen from an axicon, a spatial light modulator, an elliptical lens, or combinations thereof.

10. The system of claim 1 wherein the beam transforming element is configured to shift a phase of at least one of the multiple quasi-non-diffracting sub-beams from about $\pi/4$ to about $2\pi$.

11. The system of claim 1 wherein the quasi-non-diffracting beam is a Bessel beam, an Airy beam, a Weber beam, or a Mathieu beam.

12. A system for laser cutting at least one glass article comprising a pulsed laser assembly and a glass support assembly configured to support the glass article during laser cutting within the pulsed laser assembly, wherein the pulsed laser assembly comprises
    at least one axicon configured to convert a Gaussian beam into a Bessel beam;
    first and second collimating lenses disposed downstream of the axicon; and
    at least one beam transforming element oriented between the first and second collimating lenses, wherein the at least one beam transforming element is configured to convert the Bessel beam into multiple sub-Bessel beams which are parallel and spaced apart a distance of about 1 µm to about 500 µm;
    wherein the pulsed laser assembly is oriented to deliver one or more pulses of multiple sub-Bessel beams onto a surface of the glass article, wherein each of the one or more pulses of multiple sub-Bessel beams is operable to cut a plurality of perforations in the glass article.

13. The system of claim 12 wherein the beam transforming element is a phase grating, an amplitude grating, or combinations thereof.

14. The system of claim 12 wherein the multiple sub-Bessel beams are spaced apart a distance about 1 µm to about 20 µm.

15. The system of claim 12 wherein the beam transforming element is oriented proximate a Fourier-transform plane produced by the first collimating lens.

16. The system of claim 12 wherein the beam transforming element is oriented within a focal length of the second collimating lens.

\* \* \* \* \*

UNITED STATES PATENT AND TRADEMARK OFFICE
CERTIFICATE OF CORRECTION

| | | |
|---|---|---|
| PATENT NO. | : 10,047,001 B2 | Page 1 of 1 |
| APPLICATION NO. | : 14/943765 | |
| DATED | : August 14, 2018 | |
| INVENTOR(S) | : James Andrew West | |

It is certified that error appears in the above-identified patent and that said Letters Patent is hereby corrected as shown below:

On page 2, Column 1, item (56), U.S. Patent Documents, Line 33, delete "Canon" and insert -- Suzuki Masayuki et al. --, therefor.

On page 5, Column 1, item (56), other publications, Line 2, delete "41-189, (2007)." and insert -- 47-189, (2007). --, therefor.

Signed and Sealed this
Sixteenth Day of June, 2020

Andrei Iancu
*Director of the United States Patent and Trademark Office*